United States Patent
Fukushima et al.

[11] Patent Number: 6,144,758
[45] Date of Patent: *Nov. 7, 2000

[54] BIOCHEMICAL IMAGE ANALYZING APPARATUS

[75] Inventors: Makito Fukushima; Yoshiko Shiimori, both of Tokyo; Shin Sato, Akita; Masato Some, Kanagawa-ken, all of Japan

[73] Assignee: Fuji Photo Film Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/581,261

[22] Filed: Dec. 29, 1995

[30] Foreign Application Priority Data

Jan. 9, 1995 [JP] Japan ..................... 7-017521
Aug. 30, 1995 [JP] Japan ..................... 7-222207

[51] Int. Cl.[7] ........................................ G06K 9/00
[52] U.S. Cl. ................................ 382/128; 435/4
[58] Field of Search .................. 382/128–134, 382/171–173, 260, 261–265, 293, 250; 324/309; 536/22.1; 435/2–6, 501; 436/501; 378/63; 204/601–609; 345/420

[56] References Cited

U.S. PATENT DOCUMENTS

| | | | |
|---|---|---|---|
| 3,999,047 | 12/1976 | Green | 382/134 |
| 5,028,793 | 7/1991 | Lindmayer et al. | 250/484.1 |
| 5,133,020 | 7/1992 | Giger et al. | 382/128 |
| 5,185,574 | 2/1993 | Ehman et al. | 324/309 |
| 5,424,186 | 6/1995 | Fodor et al. | 435/6 |
| 5,432,865 | 7/1995 | Kasdan et al. | 382/128 |
| 5,515,449 | 5/1996 | Tsuruoka et al. | 382/128 |
| 5,539,838 | 7/1996 | Shimura | 382/128 |
| 5,541,064 | 7/1996 | Bacus et al. | 382/133 |
| 5,542,003 | 7/1996 | Wofford | 382/132 |
| 5,583,973 | 12/1996 | DeLisi et al. | 345/420 |
| 5,598,481 | 1/1997 | Nishikawa et al. | 382/132 |
| 5,627,907 | 5/1997 | Gur et al. | 382/132 |
| 5,837,832 | 11/1998 | Chee et al. | 536/22.1 |

FOREIGN PATENT DOCUMENTS

| | | | |
|---|---|---|---|
| 1-60784 | 12/1989 | Japan | G01N 33/60 |
| 160782 | 12/1989 | Japan | G01N 33/58 |
| 4-3952 | 1/1992 | Japan | C12N 15/00 |
| 2 246 197 | 1/1992 | United Kingdom | G01N 21/76 |
| 093016442 | 8/1993 | WIPO | 382/128 |

Primary Examiner—Jon Chang
Assistant Examiner—Jayanti K. Patel
Attorney, Agent, or Firm—Sughrue, Mion, Zinn, Macpeak & Seas, PLLC

[57] ABSTRACT

A biochemical image analyzing apparatus includes image data memory for storing image data of a biochemical image produced based on data obtained by converting to electrical signals locational information of regarding labeled substance contained in a sample produced by one-dimensionally distributing at least one specimen, a data processor for selecting image data from among the image data stored in the image data memory and processing the selected image data in a predetermined manner to produce display image data mapped in a planar coordinate system, a display for displaying an image based on the display image data, and a first image data divider for producing first divided coordinate data by dividing the display image data along one coordinate axis of the planar coordinate system to produce lanes defining regions to be quantified along the one coordinate axis. According to the thus constituted biochemical image analyzing apparatus, it is possible to quickly define regions of interest to be quantified or quantitatively analyzed in a biochemical image without requiring an operator to conduct complicated operations.

13 Claims, 31 Drawing Sheets

| 255 | 255 | 255 |
|---|---|---|
| 255 | 50 | 255 |
| 60 | 255 | 255 |

(b)

| 255 | 255 | 255 |
|---|---|---|
| 255 | 255 | 255 |
| 60 | 255 | 255 |

| 255 | 255 | 255 |
|---|---|---|
| 255 | 0 | 0 |
| 255 | 255 | 255 |

(b)

| 255 | 255 | 255 |
|---|---|---|
| 255 | 255 | 255 |
| 255 | 255 | 255 |

FIG. 10
(a)
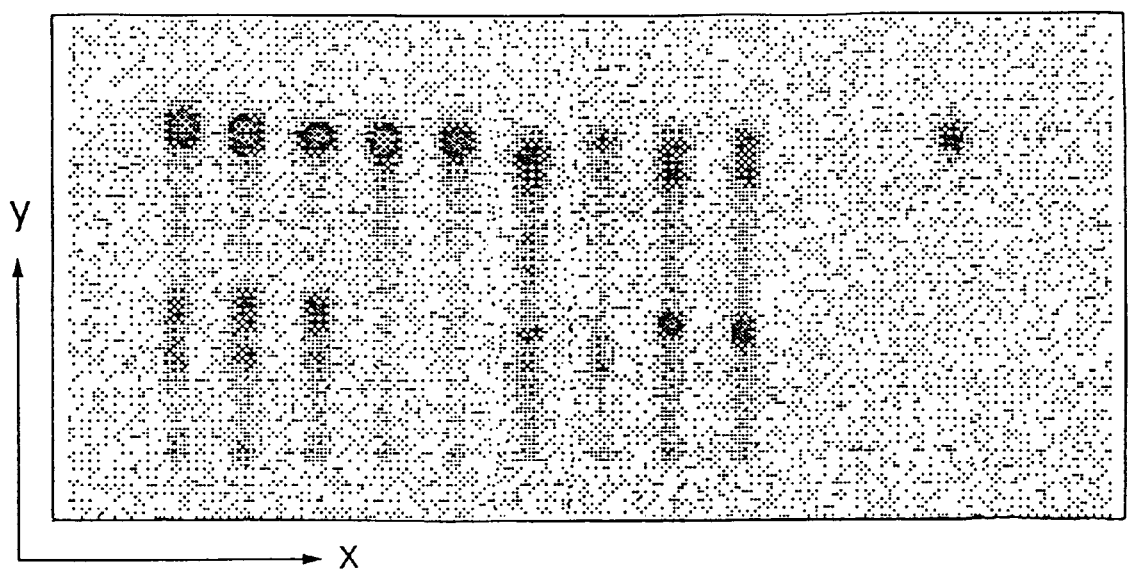
(b)
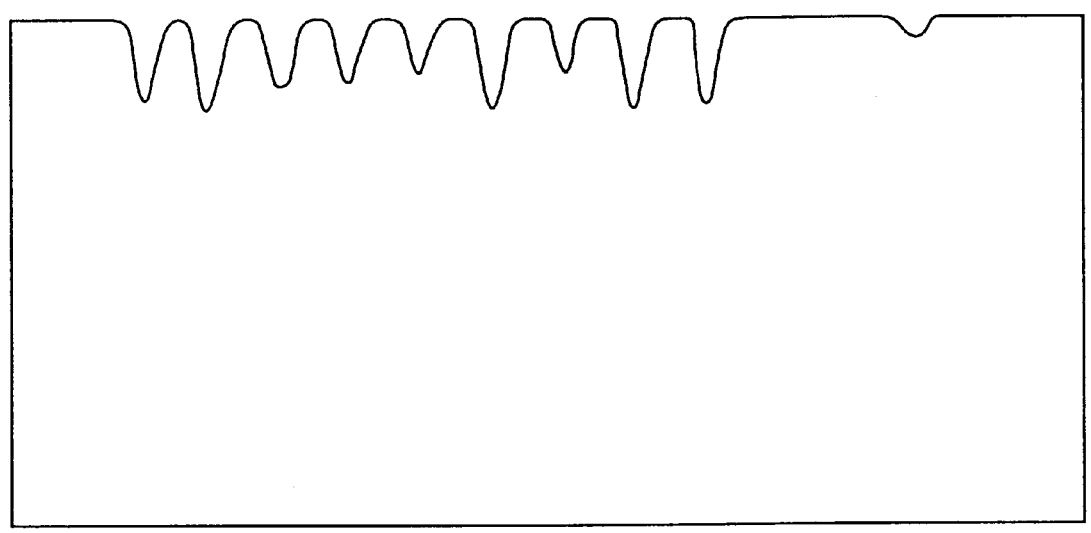

FIG. 18

| SPOT | COORDINATE DATA | DENSITY DATA (PSL VALUE) | GROUP NUMBER |
|---|---|---|---|
| sp (1,1) | ys (1,1),ye (1,1) | yp (1,1) | 1 |
| sp (1,2) | ys (1,2),ye (1,2) | yp (1,2) | 2 |
| sp (1,3) | ys (1,3),ye (1,3) | yp (1,3) | 4 |
| sp (1,4) | ys (1,4),ye (1,4) | yp (1,4) | 5 |
| sp (2,1) | ys (2,1),ye (2,1) | yp (2,1) | 1 |
| sp (2,2) | ys (2,2),ye (2,2) | yp (2,2) | 3 |
| sp (2,3) | ys (2,3),ye (2,3) | yp (2,3) | 4 |
| sp (2,4) | ys (2,4),ye (2,4) | yp (2,4) | 5 |
| sp (3,1) | ys (3,1),ye (3,1) | yp (3,1) | 1 |
| . . . | . . . | . . . | . . . |
| sp (4,4) | ys (4,4),ye (4,4) | yp (4,4) | 5 |

BIOCHEMICAL IMAGE ANALYZING APPARATUS

BACKGROUND OF THE INVENTION

The present invention relates to a biochemical image analyzing apparatus and, particularly, to such an apparatus which can automatically define a region to be quantitatively analyzed on a biochemical image including locational information regarding a labeled substance in a specimen obtained by one-dimensionally distributing at least one kind of specimen.

DESCRIPTION OF THE PRIOR ART

Various image analyzing methods are known. These include an autoradiographic process comprising the steps of introducing a radioactively labeled substance into an organism, using the organism or a part of the tissue of the organism as a specimen, placing the specimen and a radiographic film such as a high sensitivity type X-ray film together in layers for a certain period of time to expose the radiographic film thereto and obtaining locational information regarding the radioactively labeled substance in the specimen from the resolved pattern of the radiographic film and a chemiluminescent process comprising the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, detecting the chemiluminescent emission in the wavelength of visible light generated by the contact of the chemiluminescent substance and the labeling substance and obtaining information relating to the high molecular substance such as genetic information.

Conventionally, these methods are carried out by employing a photographic film as a detecting material, recording a radiographic image or a chemiluminescent image on the photographic film and observing a visual image with the eyes. However, in the case where a photographic film is employed as a detecting material, the low sensitivity of a radiographic film leads to the problem that it takes considerable time for recording an image in the autoradiographic process. Further, in the chemiluminescent process, although it is necessary to employ a highly sensitive film having a high gamma value for detecting very weak chemiluminescent emission, when the highly sensitive film having a high gamma value is employed, it is difficult to expose the film reliably using a straight portion of the characteristic curve. Therefore, the film is often exposed improperly and it is necessary to repeatedly expose films under various exposure conditions. Furthermore, in either process, it is indispensable to chemically develop the films and, therefore, the operations are unavoidably complicated.

In view of the above, there have been proposed an autoradiographic process and a chemiluminescent process comprising the steps of employing, as a detecting material for the radiation, visible light, electron beam or the like, not a photographic film, but a stimulable phosphor which can absorb and store the energy of radiation, visible light or the like upon being irradiated therewith and release a stimulated emission whose amount is proportional to that of the received radiation, the visible light or the like upon being stimulated with an electromagnetic wave having a specific wavelength range, photoelectrically detecting the stimulated emission released from the stimulable phosphor, converting the detection signal to a digital signal, effecting a predetermined image processing on the obtained image data and reproducing an image on displaying means such as a CRT or the like or a photographic film (See for example, Japanese Patent Publication No. 1-60784, Japanese Patent Publication No. 1-60782, Japanese Patent Publication No. 4-3952, U.S. Pat. No. 5,028,793, UK Patent Application 2,246,197 A and the like).

According to the detecting processes using the stimulable phosphor, development, which is a chemical process, becomes unnecessary. In addition, the exposure time can be markedly shortened in the autoradiographic process. Improper exposure becomes rare and the exposing operation becomes easy in the chemiluminescent process. Further, since the image is reproduced after the detected signal has been converted to a digital signal, the image can be reproduced in a desired manner by effecting signal processing on the image data and it is also possible to effect quantitative analysis using a computer. Use of a stimulable phosphor in these process is therefore advantageous.

Consequently, there have been proposed image analyzing apparatuses using this method for reading an autoradiographic image including locational information regarding a radioactively labeled substance in a specimen obtained by one-dimensionally distributing at least one kind of specimen or a chemiluminescent image including locational information regarding a labeled substance in a specimen obtained by one-dimensionally distributing at least one kind of specimen. This kind of image analyzing apparatus is utilized for analyzing an image produced by a TLC (Thin Layer Chromatography) method, an image of a gene produced using the Southern blot hybridization method, an image produced by poly-acrylamide gel electrophoresis for the separation or identification of protein or the estimation of molecular weight or properties of protein or the like.

In the thin layer chromatography method widely used in the field of drug metabolism research, a solid phase is formed as a thin layer of a material which interacts with a drug and the drug or a metabolite is separated thereon. When an autoradiographic process is used for the thin layer chromatography method, a drug labeled with a radioactive substance (radioisotope: RI) is introduced into a test animal and the change in the components thereof occurring in the body of the animal is analyzed. For example, urine, blood, tissue or the like is gathered from a specific part of the test animal when a predetermined time has passed after introducing a drug labeled with a radioactive substance into the test animal and treated in a predetermined manner and the resultant specimen is spot-like dropped on a predetermined portion of a TLC plate formed by coating silica gel powder on a glass plate having a thickness of about 0.5 mm to form a thin layer. The dropped specimen is dipped in a distributing solvent and then chromatographically distributed, whereby spots are formed on the TLC plate so that different components form different spots. After the TLC plate and a stimulable phosphor sheet have come into contact with each other, the stimulable phosphor sheet is scanned with an electromagnetic wave using an image reading apparatus and stimulated emission emitted from the stimulable phosphor sheet is photoelectrically detected to convert locational information regarding the radioactively labeled substance transferred from the specimen to the stimulable phosphor sheet into electrical signals, thereby producing data. An image analyzing apparatus receives the thus obtained data and stores image data including the locational information regarding the radioactively labeled substance transferred to the stimulable phosphor sheet by storing the received data in a data storing means such as a hard disc. The image analyzing apparatus further selects desired data from among the image data stored in the data storing means and signal-processes them in a desired manner or enlarges them by a predetermined magnification factor, thereby reproducing an image on a display means such as a CRT so that the locational information regarding the radioactively labeled substance can be obtained with high accuracy.

Such an image analyzing apparatus is constituted so as to be able to define a desired region in the image data as a region of interest, convert the density of pixels constituting an image included in the region of interest into a numerical value and quantify the density of the desired region in the image, namely, the amount of light emitted from the corresponding region of the stimulable phosphor sheet, by summing up the numerical values, and is further constituted so as to group a plurality of regions of interest, calculate the ratios between the densities of the regions of interest belonging to the same group, namely, the ratios between the amounts of light emitted from the corresponding regions of the stimulable phosphor sheet, and make quantitative analysis by comparing the density between the desired regions, namely, the amounts of light emitted from the desired regions of the stimulable phosphor sheet. For example, in the case where the thin layer chromatography is used for studying drug metabolism, image data are produced by gathering blood from a test animal 30 minutes, 1 hour, 2 hours and 5 hours after a drug was introduced into the test animal, simultaneously spot-like dropping the thus gathered blood specimens on a TLC plate laterally, chromatographically distributing the specimens, and transferring the specimen image information to a stimulable phosphor sheet. It is then possible to define regions corresponding to the regions where spots of specimens are formed as regions of interest, group a plurality of the regions of interest, convert the density of the regions of interest into numerical values and determine the ratios between the densities of the regions of interest belonging to the same group.

For enabling such quantitative processing and quantitative analysis, the autoradiographic image analyzing apparatus and the chemiluminescent image analyzing apparatus are constituted so as to be able to define regions of interest surrounded by rectangles in an image displayed on a display device and obtain density data of images in the respective regions of interest.

However, in the conventional autoradiographic image analyzing apparatus and chemiluminescent image analyzing apparatus, an operator has to view an image displayed on a display device, determine regions to be analyzed and define regions of interest. The operation is therefore troublesome.

For example, for making a quantitative analysis by spot-like dropping two kinds of specimens on a TLC plate simultaneously, chromatographically distributing them, producing image data using a stimulable phosphor sheet and comparing the densities between desired regions of interest in an image, namely, the amounts of light emitted from regions of the stimulable phosphor sheet corresponding to the regions of interest, the operator has to view an image displayed on a display device and define regions of interest for the respective spots formed on the TLC plate. However, the desired regions of interest containing spots in the produced image data cannot be quickly quantitatively analyzed.

Further, in the case where, for instance, the quantitative analysis is made by calculating the ratios of density data of regions of interest corresponding to a plurality spots included in a specific lane obtained by chromatographically distributing a specimen or in the case where the quantitative analysis is made by calculating the ratios between the density data of regions of interest corresponding to spots formed at corresponding positions in a plurality of lanes formed by chromatographically distributing two or more specimens, it is necessary to define regions of interest and group a plurality of the regions of interest. However, in the case where the operator views an image and groups a plurality of regions of interest, it is impossible to quickly quantitatively analyze desired regions of interest.

These problems occur not only in the case where an image produced by the thin layer chromatography method is analyzed but also in the case of analyzing an image of a gene produced using the Southern blot hybridization method, an image produced by poly-acrylamide gel electrophoresis for the separation or identification of protein or an estimation of the molecular weight or properties of protein or the like.

The same problems occur in the case where, after an autoradiographic image or a chemiluminescent image was recorded on a photographic film, the recorded image is photoelectrically read and converted to a digital image signal and the thus obtained image signal is signal processed in a desired manner, thereby reproducing a visible image on a displaying means such as a CRT or the like or on a photographic film.

SUMMARY OF INVENTION

It is therefore an object of the present invention is to provide a biochemical image analyzing apparatus which can quickly define regions of interest to be quantified or quantitatively analyzed in a biochemical image without requiring an operator to conduct complicated operations.

The above and other objects of the present invention can be accomplished by a biochemical image analyzing apparatus comprising image data storing means for storing image data of a biochemical image produced based on data obtained by converting to electrical signals locational information of regarding labeled substance contained in a sample produced by one-dimensionally distributing at least one specimen, display data producing means for selecting image data from among the image data stored in the image data storing means and processing the selected image data in a predetermined manner to produce display image data mapped in a planar coordinate system, display means for displaying an image based on the display image data, and first image data dividing means for producing first divided coordinate data by dividing the display image data along one coordinate axis of the planar coordinate system to produce lanes defining regions to be quantified along the one coordinate axis.

In a preferred aspect of the present invention, the biochemical image analyzing apparatus further includes second image data dividing means for producing second divided coordinate data by dividing the display image data divided along the one coordinate axis along the other coordinate axis to form spots defining regions to be quantified along the other coordinate axis in each of the lanes.

In a further preferred aspect of the present invention, the biochemical image analyzing apparatus further includes first noise removing means for removing data corresponding to noise contained in an image to be displayed on the display means to form noise free image data and the first image data dividing means is constituted so as to divide the noise free image data from which the data corresponding to noise have been removed by the first noise removing means along one coordinate axis of the planar coordinate system in which the display image data is mapped and to produce the first divided coordinate data for forming lanes defining regions to be quantified along the one coordinate axis.

In a further preferred aspect of the present invention, the biochemical image analyzing apparatus further includes second noise removing means for removing data corresponding to noise contained in an image to be displayed on the display means to form noise free image data and the second image data dividing means is constituted so as to divide the noise free image data from which the data corresponding to the noise have been removed by the second noise removing means along the other coordinate axis and to produce the second divided coordinate data for forming spots defining regions to be quantified along the other coordinate axis for each of the lanes.

In a further preferred aspect of the present invention, the first image data dividing means comprises first peripheral distribution data calculating means for calculating data corresponding to periphery distribution along the one of the coordinate axes by summing up density data values of pixels having the same coordinate on one coordinate axis, lane starting point coordinate calculating means for calculating coordinates of starting points of the lanes based on the data corresponding to the periphery distribution calculated by the first peripheral distribution data calculating means, lane end point coordinate calculating means for calculating coordinates of end points of the lanes based on the data corresponding to the periphery distribution calculated by the first peripheral distribution data calculating means, and lane defining coordinate data producing means for producing lane defining coordinates for defining the lanes based on the coordinates of the starting points of the lanes calculated by the lane starting point coordinate calculating means and the coordinates of the end points of the lanes calculated by the lane end point coordinate calculating means.

In a further preferred aspect of the present invention, the second image data dividing means comprises second peripheral distribution data calculating means for calculating data corresponding to periphery distribution along the other coordinate axis by summing up density data values of pixels having the same coordinates on the other coordinate axis, and spot defining coordinate data producing means for producing spot defining coordinates defining spots in each of the lanes based on the data corresponding to the periphery distribution calculated by the second peripheral distribution data calculating means.

In a further preferred aspect of the present invention, the first noise removing means is constituted so as to effect noise removing processing on the data corresponding to the periphery distribution calculated by the first peripheral distribution data calculating means, the lane starting point coordinate calculating means is constituted so as to calculate the coordinates of the starting points of the lanes based on the data corresponding to the periphery distribution from which the data corresponding to noise have been removed by the first noise removing means, and the lane end point coordinate calculating means is constituted so as to calculate the coordinates of the end points of the lanes based on the data corresponding to the periphery distribution from which the data corresponding to noise have been removed by the first noise removing means.

In a further preferred aspect of the present invention, the second noise removing means is constituted so as to effect noise removing processing on the data corresponding to the periphery distribution calculated by the second peripheral distribution data calculating means, and the spot defining coordinate data producing means is constituted so as to calculate the spot defining coordinate data based on the data corresponding to the periphery distribution from which the data corresponding to noise have been removed by the second noise removing means.

In a further preferred aspect of the present invention, the first image data dividing means comprises peak estimating means for estimating coordinates of peaks of the density data by effecting one-dimensional Fourier transform on the noise free data from which the data corresponding to noise have been removed by the first noise removing means, peak coordinate correcting means for correcting the coordinates of the peaks estimated by the peak estimating means, and the lane defining coordinate data producing means for producing the lane defining coordinates in accordance with the coordinates corrected by the peak coordinate correcting means.

In a further preferred aspect of the present invention, the biochemical image analyzing apparatus further includes group data producing means for producing group data indicating groups to which the spots in each of the lanes belong based on the lane defining coordinates and spot defining coordinates.

In a further preferred aspect of the present invention, the group data producing means comprises spot grouping means for comparing the spot defining coordinates of the lanes and groping the spots formed in each of the lanes, lane grouping means for comparing the spot defining coordinates of the lanes and grouping the lanes, and spot grouping correcting means for correcting the groups of the spots grouped by the spot grouping means based on the results of grouping of the lanes effected by the lane grouping means.

In a further preferred aspect of the present invention, the spot defining coordinate data producing means comprises region starting point/end point detecting means for detecting starting points of regions and end points of regions by comparing the values of the data corresponding to the periphery distribution calculated by the second peripherally distributed data calculating means with a predetermined value, peak point detecting means for detecting peak points where derivatives of the data corresponding to the second periphery distribution between each of the starting points of the regions and each of the end points of the regions change sign, and the spot defining coordinate data calculating means for calculating the spot defining coordinates for forming the spots based on the starting portions of the regions, the end portions of the regions and the peak points.

In a further preferred aspect of the present invention, the biochemical image analyzing apparatus further includes background noise removing means for removing data corresponding to background noise of an image to be displayed on the display means from the display image data and producing background noise free image data and the first image data dividing means is constituted so as to produce the lane defining coordinates data for forming the lanes defining regions to be quantified along the one coordinate axis by dividing the background noise free image data along the one coordinate axis of the planar coordinate system in which the display image data are to be mapped.

In a further preferred aspect of the present invention, the background noise removing means comprises isolation point removing means for defining regions containing a plurality of pixels constituting the display image data and, when the density data of pixels at predetermined positions in the region are different from those of pixels at other positions in the region, converting the density data values of the pixels at the predetermined positions to predetermined values, thereby removing from the region pixels having density data isolated.

In a further preferred aspect of the present invention, the background noise removing means further comprises binarizing means for binarizing data output from the isolation point removing means, and second isolation point removing means for defining a region containing a plurality of pixels in the data output from the binarizing means and, when the density data of pixels at predetermined positions in the region are different from those of pixels at other positions in the region, converting the density data values of the pixels at the predetermined positions to predetermined values, thereby removing from the region pixels having density data isolated.

In a further preferred aspect of the present invention, the image analyzing apparatus is constituted so that as the density data value increases, an image corresponding to the pixels having the density data is displayed on the display means to be whiter and the background noise removing means further comprises contrast enhancing means for expanding the density data of pixels constituting the display image data to a predetermined range, thereby enhancing contrast, and density converting means for producing a density histogram of the display data whose contrast has been enhanced and allotting maximum values of density data to density data whose values are greater than density data determining a predetermined area of the density histogram therebelow and data whose density data have been converted are sent to the isolation point removing means.

In a further preferred aspect of the present invention, the image analyzing apparatus is constituted so that as the density data value increases, an image corresponding to the pixels having the density data is displayed on the display means to be whiter and the background noise removing means further comprises contrast enhancing means for expanding the density data of pixels constituting the display image data to a predetermined range, thereby enhancing contrast, and density converting means for calculating an average value of density data of pixels contained in a predetermined region selected from the display image data and allotting maximum values of density data to density data whose values are greater than the average value and data whose density data have been converted are sent to the isolation point removing means.

In a further preferred aspect of the present invention, the image data is produced using a stimulable phosphor sheet.

In a further preferred aspect of the present invention, the image data are constituted by image data selected from a group consisting of autoradiographic image data and chemiluminescent image data.

In a further preferred aspect of the present invention, the autoradiographic image data are produced by absorbing and storing in a stimulable phosphor the energy of a radiation emitted from a specimen, irradiating the stimulable phosphor with an electromagnetic wave and photoelectrically converting light emitted from the stimulable phosphor.

In a further preferred aspect of the present invention, the chemiluminescent image data are produced by absorbing and storing in a stimulable phosphor the energy of a visible light emitted from a specimen, irradiating the stimulable phosphor with an electromagnetic wave and photoelectrically converting light emitted from the stimulable phosphor.

In the present invention, locational information as termed here includes a variety of information relating to the location of radioactive labeled substances, or aggregations thereof, present in a specimen, such as the location, the shape, the concentration, the distribution or combinations of such information.

In the present invention, the stimulable phosphor employed for producing an autoradiographic image may be of any type insofar as it can store radiation energy or electron beam energy and can be stimulated by an electromagnetic wave to release the radiation energy or electron beam energy stored therein in the form of light. However, a stimulable phosphor which can be stimulated by light having a visible light wavelength is preferably employed. More specifically, preferably employed stimulable phosphors include alkaline earth metal fluorohalide phosphors $(Ba_{1-x},M^{2+}_x)FX:yA$ (where $M^{2+}$ is at least one alkaline earth metal selected from the group consisting of Mg, Ca, Sr, Zn and Cd; X is at least one halogen selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2.) disclosed in U.S. Pat. No. 4,239,968, alkaline earth metal fluorohalide phosphors SrFX:Z (where X is at least one halogen selected from the group consisting of Cl, Br and I; and Z is at least one of Eu and Ce.) disclosed in Japanese Patent Application Laid Open No. 2-276997, europium activated complex halide phosphors BaFX xNaX':aEu$^{2+}$ (where each of X and X' is at least one halogen selected from the group consisting of Cl, Br and I; x is greater than 0 and equal to or less than 2; and y is greater than 0 and equal to or less than 0.2.) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1.) disclosed in Japanese Patent Application Laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1.) disclosed in U.S. Pat. No. 4,539,137 and europium activated complex halide phosphors $M^{II}FXaM^{I}X'bM^{II}X''_2cM^{III}X'''_3xA:yEu^{2+}$ (where $M^{II}$ is at least one alkaline earth metal selected from the group consisting of Ba, Sr and Ca; $M^{I}$ is at least one alkaline metal selected from the group consisting of Li, Na, K, Rb and Cs; $M^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X' , X" and X''' is at least one halogen selected from the group consisting of F, Cl, Br and I; a is equal to or greater than 0 and equal to or less than 2; b is equal to or greater than 0 and equal to or less than $10^{-2}$; c is equal to or greater than 0 and equal to or less than $10^{-2}$; a+b+c is equal to or greater than $10^{-2}$; x is greater than 0 and equal to or less than 0.5; and y is greater than 0 and equal to or less than 0.2.) disclosed in U.S. Pat. No. 4,962,047.

In the present invention, the stimulable phosphor employed for producing a chemiluminescent image may be of any type insofar as it can store the energy of light having a visible light wavelength and can be stimulated by an electromagnetic wave to release the energy of light having a visible light wavelength stored therein in the form of light. However, a stimulable phosphor which can be stimulated by light having a visible light wavelength is preferably employed. More specifically, preferably employed stimulable phosphors include metal halophosphates, rare-earth-activated phosphors, aluminate-host phosphors, silicate-host phosphors and fluoride-host phosphors disclosed in UK Patent Application 2,246,197 A.

The above and other objects and features of the present invention will become apparent from the following description made with reference to the accompanying drawings.

BRIEF DESCRIPTION OF THE DRAWINGS

FIG. 7($a$), ($b$) is a view for describing processing effected by a density isolating point removal processing section.

FIG. 8($a$), ($b$) is a view for describing processing effected by an isolation point removal processing section.

FIG. 10($a$), ($b$) is a view for describing processing effected by an x-axis direction peripheral distribution calculating section.

FIG. 18 is a view showing a quantitative database in a quantitative data storing section.

DESCRIPTION OF THE PREFERRED EMBODIMENTS

Figure 1:
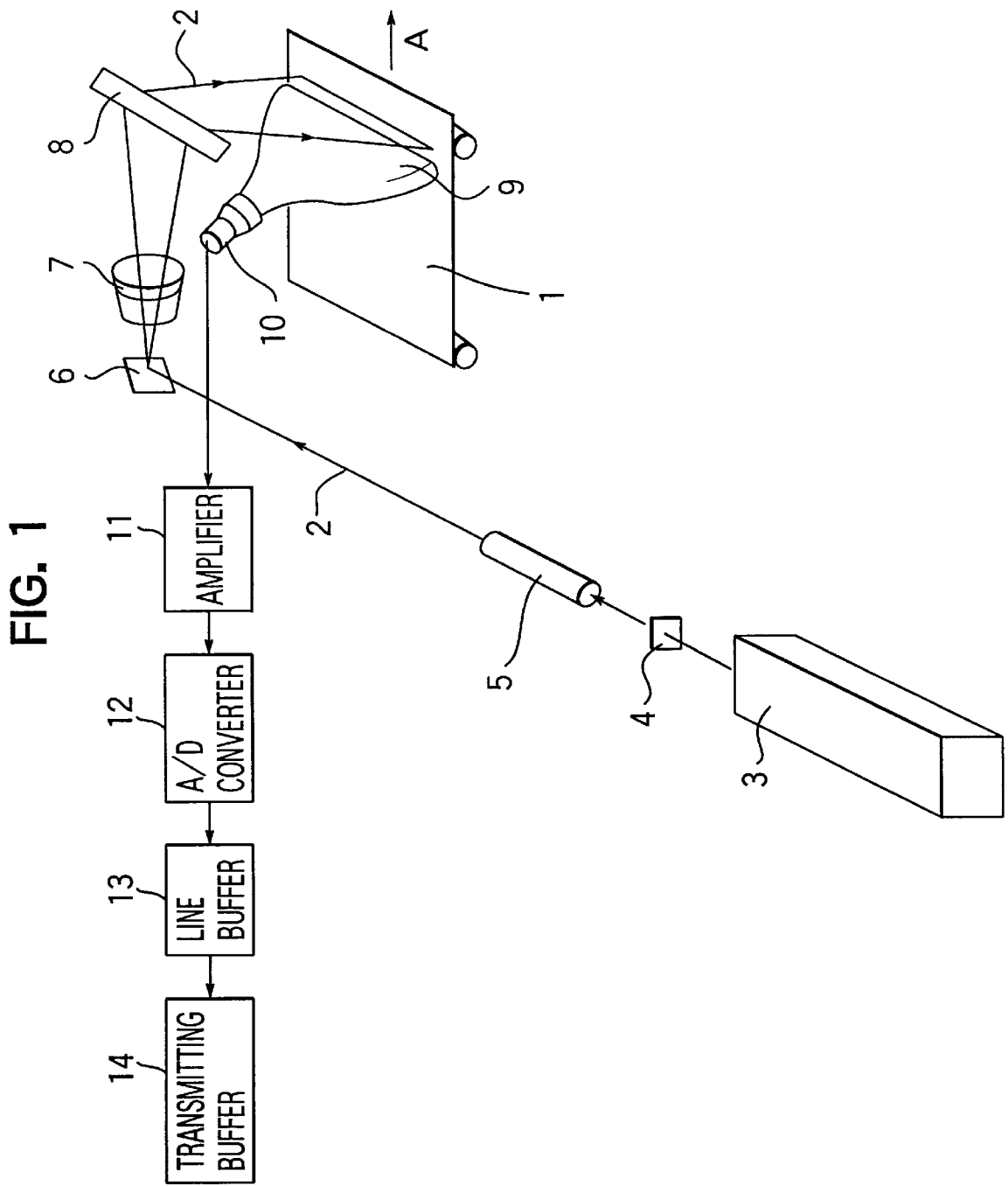
FIG. 1 is a schematic perspective view showing an image reading apparatus for producing image data to be analyzed by an autoradiographic image analyzing apparatus which is an embodiment of the present invention.

A stimulable phosphor sheet 1 shown in FIG. 1 stores locational information regarding radioactive labeling material contained in a specimen (not shown) in the form of radioactive energy. In this example, a plurality kinds of drugs whose components were different from each other were introduced into test animals and urine, bile and excrement were gathered from the test animals after a predetermined time had passed. Then, the specimens were chromatographically distributed on a TLC plate and an image was transferred to the stimulable phosphor sheet 1. The thus transferred image was stored in the stimulable phosphor sheet 1. Therefore, the image stored in the stimulable phosphor sheet 1 includes one-dimensional lanes formed by chromatographically distributing urine, bile and excrement gathered from the test animals and spots formed in each of the lanes.

The stimulable phosphor sheet 1 which stores the locational information regarding a radioactive material in the specimen is scanned with a laser beam 2 and stimulated, thereby being caused to emit stimulated emission.

The laser beam 2 is generated by a laser beam source 3 and passes through a filter 4 to cut off light in the wavelength region corresponding to the wavelength region of stimulated emission to be emitted from the stimulable phosphor sheet 1 in response to stimulation by the laser beam 2. The beam diameter of the laser beam 2 is accurately adjusted by a beam expander 5 and the laser beam 2 enters a beam deflector 6 such as a galvanometer. The laser beam 2 deflected by the beam deflector 6 passes through an fθ lens 7 and is reflected by a plane reflecting mirror 8, thereby impinging upon the stimulable phosphor sheet 1. The fθ lens 7 ensures that the stimulable phosphor sheet 1 is always scanned with the laser beam 2 at a uniform beam speed.

Figure 4:
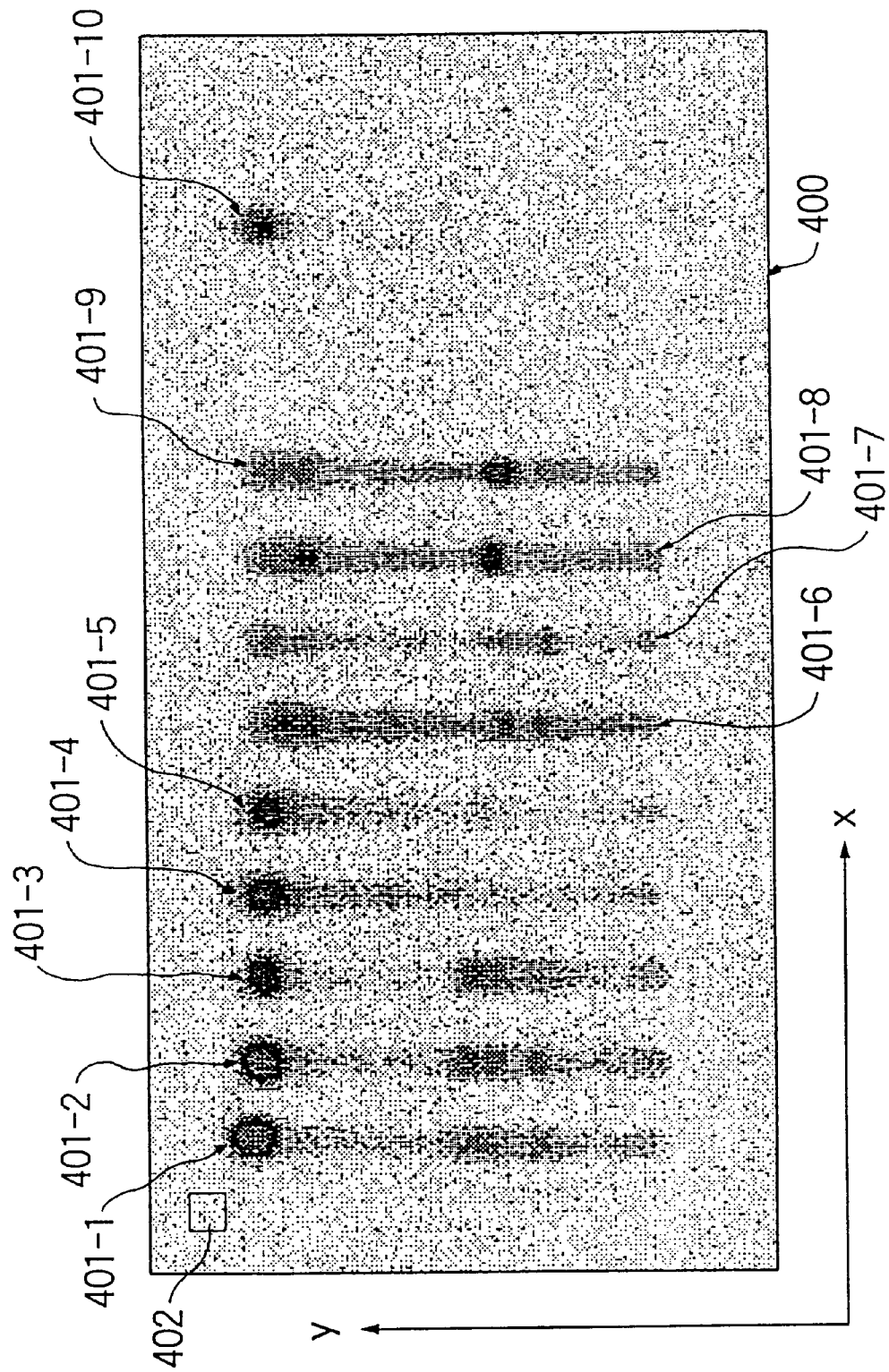
FIG. 4 is a view showing an image displayed on a CRT corresponding to display image data produced from image data read by an image reading apparatus and stored in an image data storing section.

The stimulable phosphor sheet 1 is conveyed in the direction along the arrow A in FIG. 4 in synchronism with the above mentioned scanning with the laser beam 2 so that the whole surface of the stimulable phosphor sheet 1 is scanned by the laser beam 2.

When irradiated with the laser beam 2, the stimulable phosphor sheet 1 releases stimulated emission in an amount proportional to the radiation energy stored therein and the stimulated emission enters a light guiding sheet 9.

The light receiving end of the light guiding sheet 9 has a linear shape and is positioned in the vicinity of the stimulable phosphor sheet 1 so as to face the scanning line on the stimulable phosphor sheet 1. The exit end of the light guiding sheet 9 is in the form of a ring and is connected to the light receiving surface of a light detector 10 such as a photomultiplier for photoelectrically detecting light. This light guiding sheet 9 is made by processing a transparent thermoplastic resin sheet such as an acrylic synthetic resin sheet and so constituted that the emission introduced from the light receiving end is transmitted to the exit end under repeated total reflection within the light guiding sheet 9 and received by the light receiving surface of the light detector 10 via the exit end.

Therefore, the stimulated emission produced by the stimulable phosphor sheet 1 upon being irradiated with the laser beam 2 enters into the light guiding sheet 9 and is received by the light detector 10 via the exit end under repeated total reflection within the sheet 9.

On the light receiving surface of the light detector 10 is provided a filter which allows only light of the wavelength region of the stimulated emission released from the stimulable phosphor sheet 1 to pass through and cuts off light of the wavelength region of the laser beam so that the light detector 10 can photoelectrically detect only the stimulated emission released from the stimulable phosphor sheet 1.

The stimulated emission photoelectrically detected by the light detector 10 is converted to an electrical signal, amplified by an amplifier 11 having a predetermined amplifying factor so as to produce an electrical signal of a predetermined level and then input to an A/D converter 12. The electrical signal is converted to a digital signal with a scale factor suitable for the signal fluctuation width and input to a line buffer 13. The line buffer 13 temporarily stores image data corresponding to one scanning line. When the image data corresponding to one scanning line have been stored in the line buffer 13 in the above described manner, the line buffer 13 outputs the data to a transmitting buffer 14 whose capacity is greater than that of the line buffer 13 and when the transmitting buffer 14 has stored a predetermined amount of the image data, it outputs the image data to an autoradiographic image analyzing apparatus.

Figure 2:
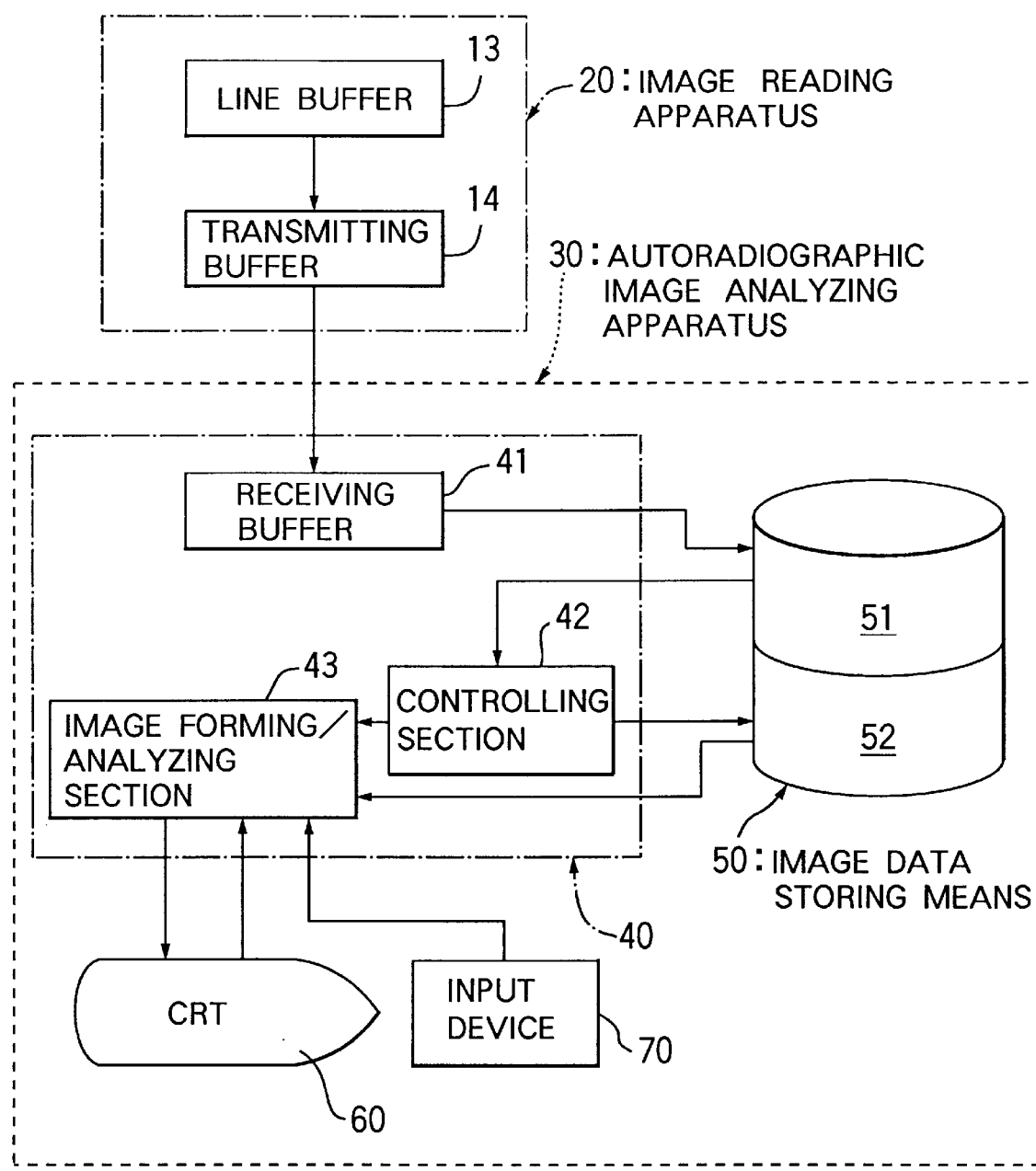
FIG. 2 is a block diagram of an autoradiographic image analyzing apparatus and an image reading apparatus.

FIG. 2 is a block diagram of the autoradiographic image analyzing apparatus and an image reading apparatus.

As shown in FIG. 2, the autoradiographic image analyzing apparatus 30 includes signal processing means 40 for receiving image data containing locational information regarding radioactive labeling material contained in a specimen, which were stored and recorded in the stimulable phosphor sheet 1, read out by the image reading apparatus 20 and converted to a digital signal, and processing them so as to reproduce a visible image which has desirable density, tone, contrast and the like, and has excellent observation and analysis property, image data storing means 50 for temporarily storing image data which were input to the signal processing means 40 from the image reading apparatus 20 and storing image data which have been processed, a CRT 60 for reproducing an image based on the image data containing locational information regarding radioactive labeling material contained in a specimen, and an input device 70 which is operated by an operator and through which data for giving predetermined instructions to the signal processing means 40 are input.

The autoradiographic image analyzing apparatus 30 includes a receiving buffer 41 and a control section 42 and the image data temporarily stored in the transmitting buffer 14 of the image reading apparatus 20 are input to the receiving buffer 41 in the signal processing means 40 of the autoradiographic image analyzing apparatus 30 and temporarily stored therein. When a predetermined amount of the image data has been stored in the receiving buffer 41, the stored image data are output to an image data temporary storing section 51 in the image data storing means 50 and stored therein in accordance with the instructions of the control section 42. In this manner, the image data fed from the transmitting buffer 14 of the image reading apparatus 20 to the receiving buffer 41 of the signal processing means 40 and temporarily stored therein are fed from the transmitting buffer 14 to the image data temporary storing section 51 in the image data storing means 50. When the image data obtained by scanning the whole surface of the stimulable phosphor sheet 1 with the laser beam 2 have been stored in the image data temporary storing section 51 in the image data storing means 50, the control section 42 in the signal processing means 40 reads predetermined image data from the image data temporary storing section 51 and stores them in an image data storing section 52.

Further, the signal processing section 40 of the autoradiographic image analyzing apparatus 30 includes an image forming/analyzing section 43 which reads the image data stored in the image data storing section 52, processes them in a predetermined manner, outputs them to the CRT 60, and also quantitatively analyzes the image data.

Figure 3:
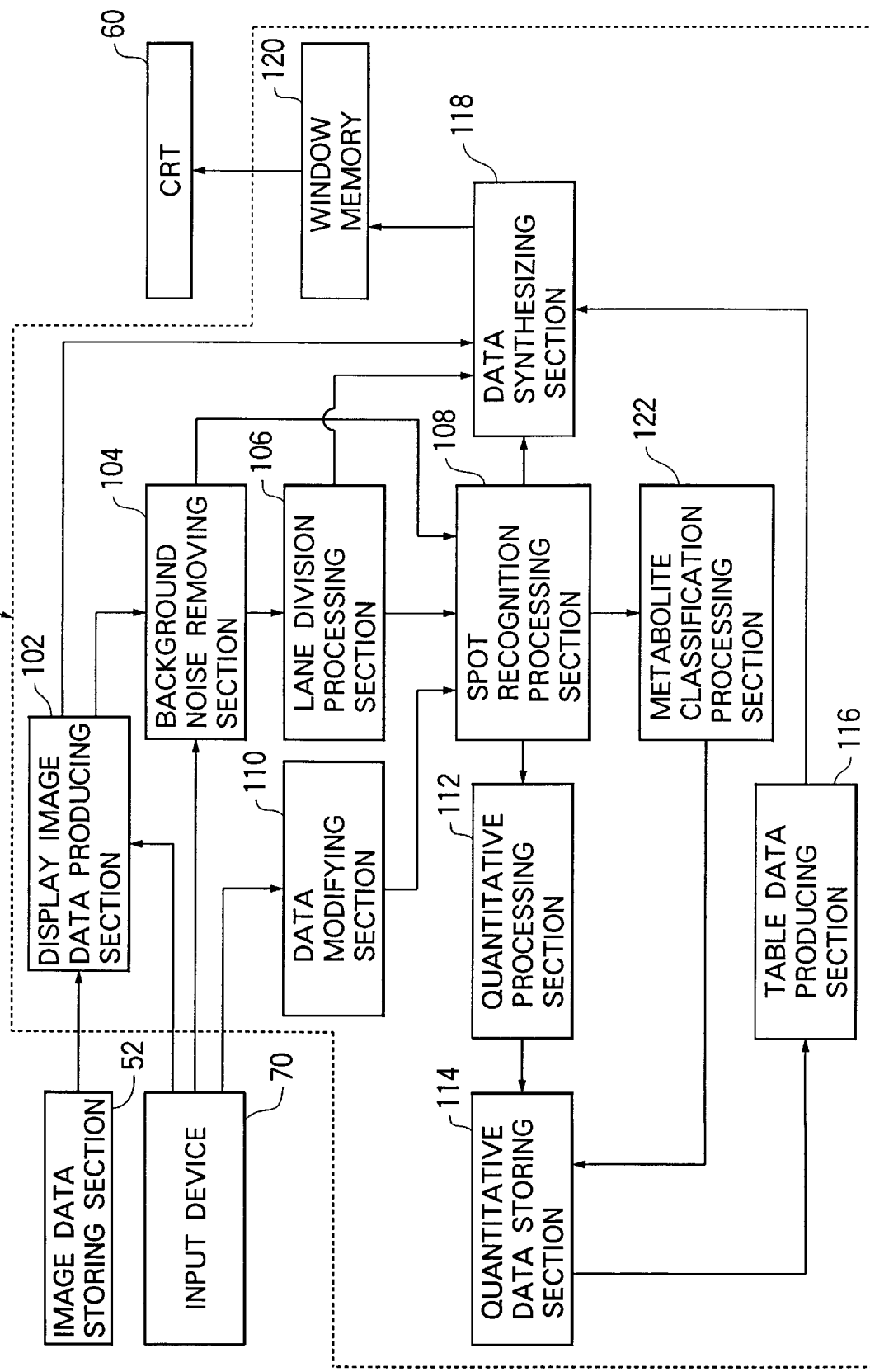
FIG. 3 is a block diagram showing an image forming/analyzing section and peripheral circuits thereof.

FIG. 3 is a block diagram showing the image forming/analyzing section 43 of the autoradiographic image analyzing apparatus along with peripheral circuits thereof. As shown in FIG. 3, the image forming/analyzing section 43 includes a display image data producing section 102 for producing display image data corresponding to an image to be displayed on the CRT 60 by processing image data read out from the image data storing section 52 in a predetermined manner in response to the operation of the input device by an operator, a background noise processing section 104 for removing data corresponding to noise in a background portion from the display image data produced by the display image data producing section 102, a lane division processing section 106 for forming lanes defining regions to be quantified in the x-axis direction by dividing the display image data along the x-axis of a planar coordinate system in which the display image data are mapped, a spot recognition processing section 108 for recognizing spots defining regions to be quantified in the y-axis direction in each of the lanes formed by the lane division processing section 106 and producing spot region data, a data modifying section 110 for modifying the spot region data produced by the spot recognition processing section 108 in accordance with input data entered through to the input device 70, a quantitative processing section 112 for calculating density data of pixels contained in the respective spots based on the spot region data, a quantitative data storing section 114 for storing the density data produced by the quantitative processing section 112 and the like, table data producing section 116 for producing table data corresponding to a table to be displayed on the CRT 60 based on the density data stored in the quantitative data storing section 114, a data synthesizing section 118 for synthesizing the display image data produced by the display image data storing section 102, the lanes formed by the lane division processing section 106, the spot region data produced by the spot recognition processing section 108 and the table data produced by the table data producing section 116, a window memory 120 for mapping the image data synthesized by the data synthesizing section 1 18, and a metabolite classification processing section 122 for producing group data for groping the spots in each of the lanes based on the spot region data.

FIG. 4 is shows an image displayed on the screen of the CRT 60 based on the display image data produced by the display image data producing section 102 in accordance with the input data from the input device 70 using the image data read by the image reading apparatus 20 and stored in the image data storing section 52.

As shown in FIG. 4, the image displayed on the screen of the CRT 60 includes lanes 401-1 to 401-10 formed by chromatographically distributing ten specimens dropped on the TLC plate and each containing a plurality of spots. The lanes 401-1, 401-2 and 401-3 were respectively obtained by introducing a drug into a male test animal, gathering bile after four hours, eight hours and twenty four hours and chromatographically distributing it on a TLC plate and the lane 401-4 was obtained by introducing a drug into a male test animal, and gathering excrement after twenty four hours. The lane 401-5 was obtained by introducing a drug into a female test animal, and gathering excrement after twenty four hours, and the lanes 401-6 and 401-7 were obtained by introducing a drug into a male test animal, gathering urine after four hours and twenty four hours and chromatographically distributing it on a TLC plate. The lanes 401-8 and 401-9 were obtained by introducing a drug into a female test animal, gathering urine after four hours and twenty four hours and chromatographically distributing it on a TLC plate. The lane 401-10 is a reference obtained by chromatographically distributing the same drug as that introduced into the test animals on a TLC plate without introducing it into a test animal.

When the stimulable phosphor sheet 1 is exposed, it is exposed to radiation contained in cosmic rays and from the ground, inherent radiation of the TLC plate for chromatographically distributing the specimens or the like so that noise components are uniformly generated on the stimulable phosphor sheet 1, whereby the image displayed on the screen 400 of the CRT 60 includes background noise in portions where the spots are not formed.

The display image data are constituted of a plurality of pixels and each pixel includes density data indicating density. In this embodiment, the range of the density data values is from 0 to 255 and when a pixel has a density data value of 0, the pixel is displayed on the CRT 60 as a black pixel, while a pixel having a density data value of 255 is displayed on the CRT 60 as a white pixel.

Figure 5:
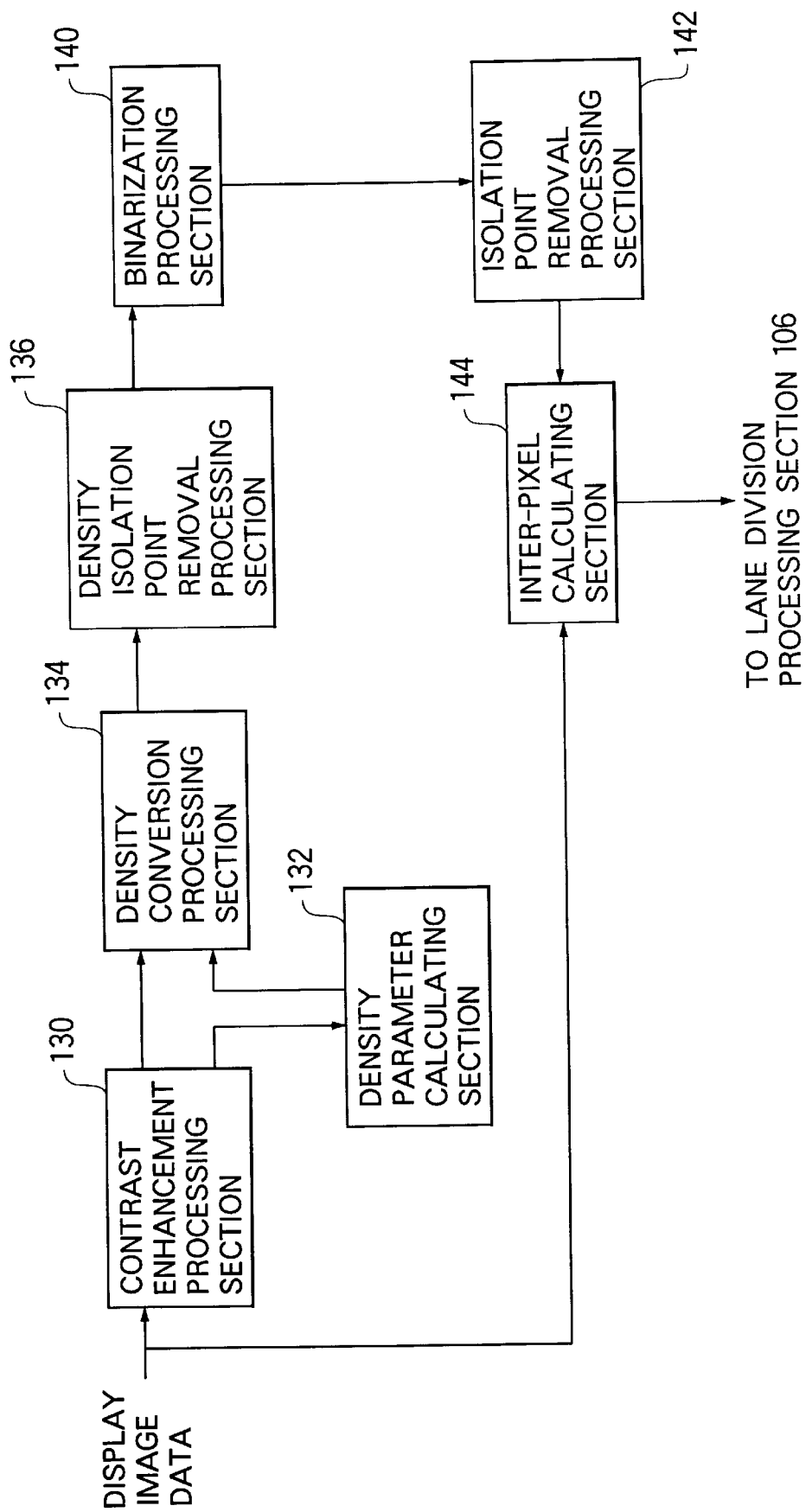
FIG. 5 is a block diagram showing a configuration of a background noise processing section.

FIG. 5 is a block diagram showing the configuration of the background noise processing section 104.

As shown in FIG. 5, the background noise processing section 104 comprises a contrast enhancement processing section 130 for correcting the deviation of the density data of the pixels constituting the display image data and producing contrast enhanced image data, a density conversion parameter calculating section 132 for calculating a density conversion parameter for determining the range of the density data values of the pixels constituting image data corresponding to the background noise, a density conversion processing section 134 for converting the density data values of the pixels, a density isolation point removal processing section 136 for finding pixels whose converted density data values are isolated from those of other pixels having a predetermined range of density data values and removing them by converting the density data values of the pixels, a binarization processing section 140 for binarizing the image data obtained by the density isolation point removal processing section 136, an isolation point removal processing section 142 for finding pixels whose converted density data values are isolated from those of others within a predetermined range of pixels constituting the binarized image data and removing them by converting the density data values thereof, and an interpixel calculating section 144 for allotting unconverted density data to image data corresponding to pixels within a range other than the background among the binarized image data produced by the isolation point removal processing section 142.

When the display image data are input from the display image data producing section 102 to the contrast enhancement processing section 130, the contrast enhancement processing section 130 calculates the range of the density data values of the pixels constituting the display image data. The contrast enhancement processing section 130 converts the density data values of the respective pixels so as to expand the range of the thus obtained density data values to 0 to 255. More specifically, assuming that the minimum value of the density data values of the pixels constituting the display image data is "a" and the maximum value thereof is "b", the density data value of a pixel having a density data value "c" is converted to "c'" using the following formula.

$$c'=(c-a)\times 255/(b-a)$$

In this manner, even if deviation of the density data values of the pixels has been occurred due to the exposure conditions of the stimulable phosphor sheet 1 when the image carried on the TLC plate was transferred thereto, the characteristic of the stimulable phosphor sheet 1 and the like, the display image data can be converted to a desired contrast by converting the density data values of the pixels.

The contrast enhancement processing section 130 outputs the contrast enhanced image data obtained by converting the density data to the density conversion parameter calculating section 132 and the density conversion processing section 134.

The density conversion parameter calculating section 132 produces a histogram of the density data values of the pixels constituting the contrast enhanced image data input from the contrast enhancement processing section 130 and determines the range of the density data values of the pixels constituting the image data corresponding to the background noise based on the histogram.

Figure 6:
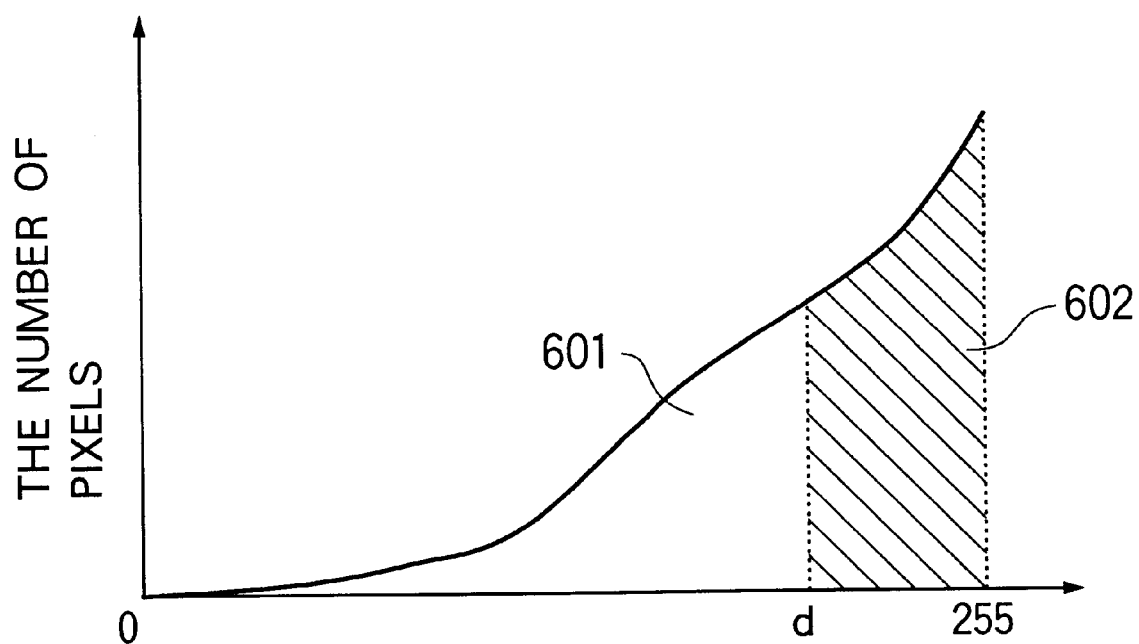
FIG. 6 is a graph showing a density histogram produced by a density conversion parameter calculating section.

FIG. 6 shows an example of the histogram produced by the density conversion parameter calculating section 132. The density conversion parameter calculating section 132 calculates the number of pixels having the same density data value for each density data value and produces a histogram as shown in FIG. 6. Then, the density conversion parameter calculating section 132 determines a density data value "d" associated with a region 601 containing the pixels corresponding to "s" % of the total number of pixels constituting the display image data as a density conversion parameter and outputs it to the density conversion processing section 134. The value "s" for defining the density conversion parameter "d" can be set by an operator using the input device 70.

The density conversion processing section 134 converts a density data value to 255 when the density data value "e" of a pixel constituting the display image data is greater than the density conversion parameter "d", namely, when the pixel is displayed on the CRT 60 to be whiter than a pixel having the density conversion parameter "d". More specifically, the density conversion processing section 134 produces density converted image data in the following manner depending on the density data value "e" and outputs them to the density isolation point removal processing section 136.

Density conversion data=255 (d<e≦255)

Density conversion data=e (0≦e≦0)

The thus produced density conversion image data still contain density data having density data values equal to or lower than the density conversion parameter "d", namely, pixels having density data to be displayed on the CRT 60 to be black, such as at the region 402 shown in FIG. 4 even though they correspond to the background, namely, pixels present in the region where no spot is formed. Therefore, the density isolation point removal processing section 136 defines a rectangular region having (2m+1)×(2m+1) pixels from among the pixels constituting the density conversion image data and converts the density data values of predetermined pixels to "f"th value from the lowest density data value of the pixels included in the thus define rectangle. In this embodiment, "m" is set to be 1 and the density isolation point removal processing section 136 is constituted so as to define a rectangular region having 3×3 pixels and convert the density data value of the pixel positioned in the center of the thus defined region to the third value from the lowest among the density data values of the pixels included in the rectangular region. Accordingly, if the density data values of the density conversion image data constituted by (2m+1)× (2m+1) pixels are those shown in FIG. 7(*a*), the density isolation point removal processing section 136 converts the density data values of the pixels positioned in the center of the thus defined region to the third value from the lowest, namely, 255, as shown in FIG. 7(*b*). The parameter "m" relating to the number of pixels constituting the rectangular region and the parameter "f" used for converting the density data value can be arbitrarily set using the input device 70. In this manner, it is possible to remove pixels which would be displayed on the CRT 60 to be black, even though they correspond to the background, by converting the density data values of the pixels, and therefore, to obtain image data suitable for display on the screen of the CRT 60.

The data output from the density isolation point removal processing section 136 are sent to the binarization processing section 140. The binarization processing section 140 judges that regions other than those having density data values of 255 are regions where spots are formed and converts the density data values of all pixels contained in the regions to 0. More specifically, the binarization processing section 140 produces output density data values using the following formulas based on the input density data value "g" and outputs them to the isolation point removal processing section 142.

Output density data value=255 (g=255)

Output density data value=0 (g≠255)

The isolation point removal processing section 142 defines a rectangular region having n×n pixels among pixels constituting the image data input from the binarization processing section 140 and converts the density data values of all pixels within the thus defined region to 255 when the number of pixels having density data values of 0 is equal to or less than "h" within the region. In this embodiment, "n" is set to be 3 and the isolation point removal processing section 142 is constituted so as to define a rectangular region having 3×3 pixels and convert the density data values of all pixels within the thus defined region to 255 when the number of pixels having the density data values of 0 is equal to or less than two within the region. Therefore, if the density data values of the density conversion image data constituted of n×n pixels are those shown in FIG. 8(*a*), the isolation point removal processing section 142 converts the density data values of all pixels to 255 as shown in FIG. 8(*b*). The parameter "h" indicating a critical number of pixels can be arbitrarily set using the input device 70. In this manner, it is possible to remove pixels corresponding to isolation points which would otherwise be displayed on the CRT 60 to be black even though they correspond to the background.

The binarized data from which the isolation points have been removed by the isolation point removal processing section 142 are sent to the interpixel calculating section 144. Based on the binarized data and the display image data input from the display image data producing section 102, the interpixel calculating section 144 keeps the density data value of a pixel at 255 when the value of the binarized data thereof are 255 and gives the density data value of the corresponding display image data to the pixel when the value of the binarized data are 0, thereby producing noise free image data from which the background noise has been removed. As a result, the pixels of the noise free image data whose binarized data are 255 have the density data value of 255, while the pixels of the noise free image data whose binarized data is 0 have the same density data value as that of the display image data.

The thus produced noise free image data are fed to the lane division processing section 106.

Figure 9:
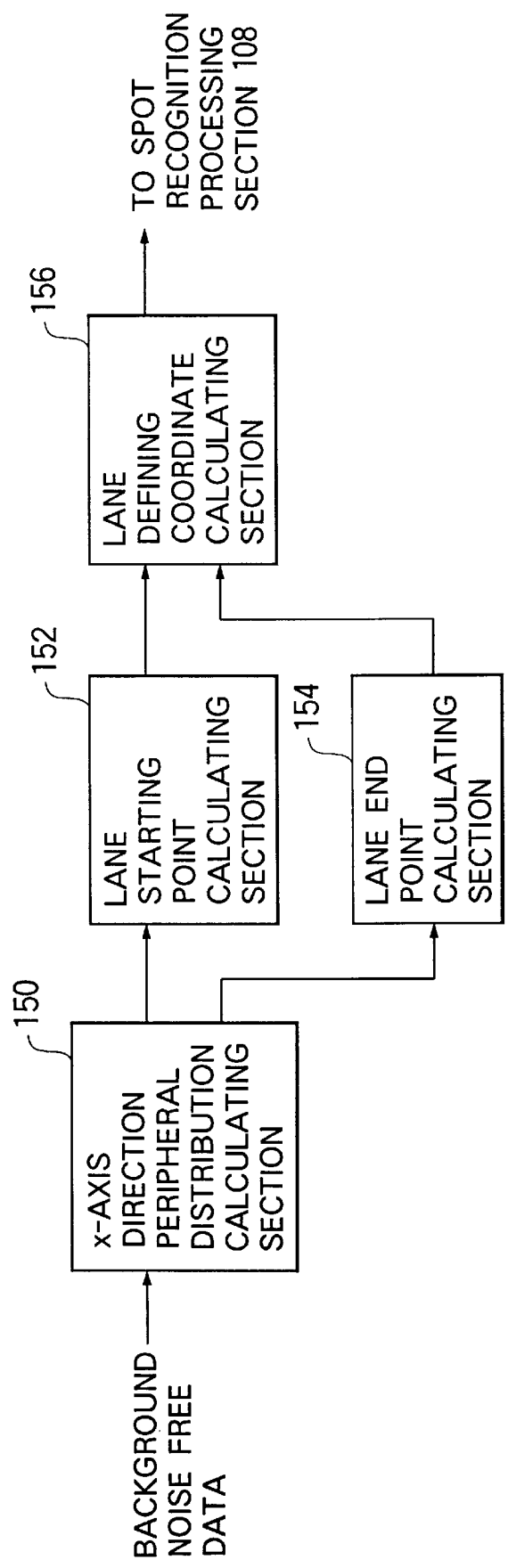
FIG. 9 is a block diagram showing a configuration of a lane division processing section.

FIG. 9 is a block diagram showing the configuration of the lane division processing section 106 for defining lanes defining regions to be quantified in the x-axis direction. As shown in FIG. 9, the lane division processing section 106 comprises a x-axis direction peripheral distribution calculating section 150 for calculating the sum in the direction of the y-axis of the density data values of pixels having the same x coordinate of the planar coordinate system in which the display image data are mapped and produces peripheral distribution data indicating the peripheral distribution of the density data values in the x-axis direction, a lane starting point detecting section 152 for, based on the peripheral distribution data produced by the x-axis direction peripheral distribution calculating section 150, detecting lane starting points defining lanes to be quantified and containing a plurality of spots, a lane end point detecting section 154 for detecting end points of the lanes based on the peripheral distribution data, and a lane defining coordinate calculating section 156 for producing lane defining coordinates for defining the lanes where the spots are formed based on the data detected by the lane starting point detecting section 152 and the lane end point detecting section 154.

In the case where an image is displayed on the screen 400 of the CRT 60 as shown in FIG. 10(*a*), the x-axis direction peripheral distribution calculating section 150 calculates the sum of the density data values of the pixels in the noise free image data having the same x coordinate value, as shown in FIG. 10(*b*). Then, the x-axis direction peripheral distribution calculating section 150 effects low-pass filter processing on the sums of the density data values for removing high frequency components contained therein. Further, the x-axis direction peripheral distribution calculating section 150 compares the density data values from which the high frequency components have been removed by the low-pass filter processing with a threshold value "i" determined in advance and when the data values are greater than the threshold value "i", the x-axis direction peripheral distribution calculating section 150 produces the x-axis direction peripheral distribution data by replacing them with the threshold value "i".

The thus produced the x-axis direction peripheral distribution data are output to the lane starting point detecting section 152 and the lane end point detecting section 154.

The lane starting point detecting section 152 effects k-point smoothing differentiation on the x-axis direction peripheral distribution data. In this embodiment, five-point smoothing differentiation is effected and smoothed data is produced as shown in the following formula.

$$b(n)=\{(-2)\times a(n-2)+(-1)\times a(n-1)+0\times a(n)+1\times a(n+1)+2\times a(n+2)\}/5$$

In the above formula, a(n) indicates the value of the x-axis direction peripheral distribution data of a pixel having an x-coordinate of "n" and b(n) is the value of the smoothed data of the pixel having an x-coordinate of "n".

Then, the lane starting point detecting section 152 determines the x-coordinates of points where the smoothed data begin to decrease. In this manner, as shown FIG. 11, decrease starting points S(1) to S(11) are obtained.

Figure 11:
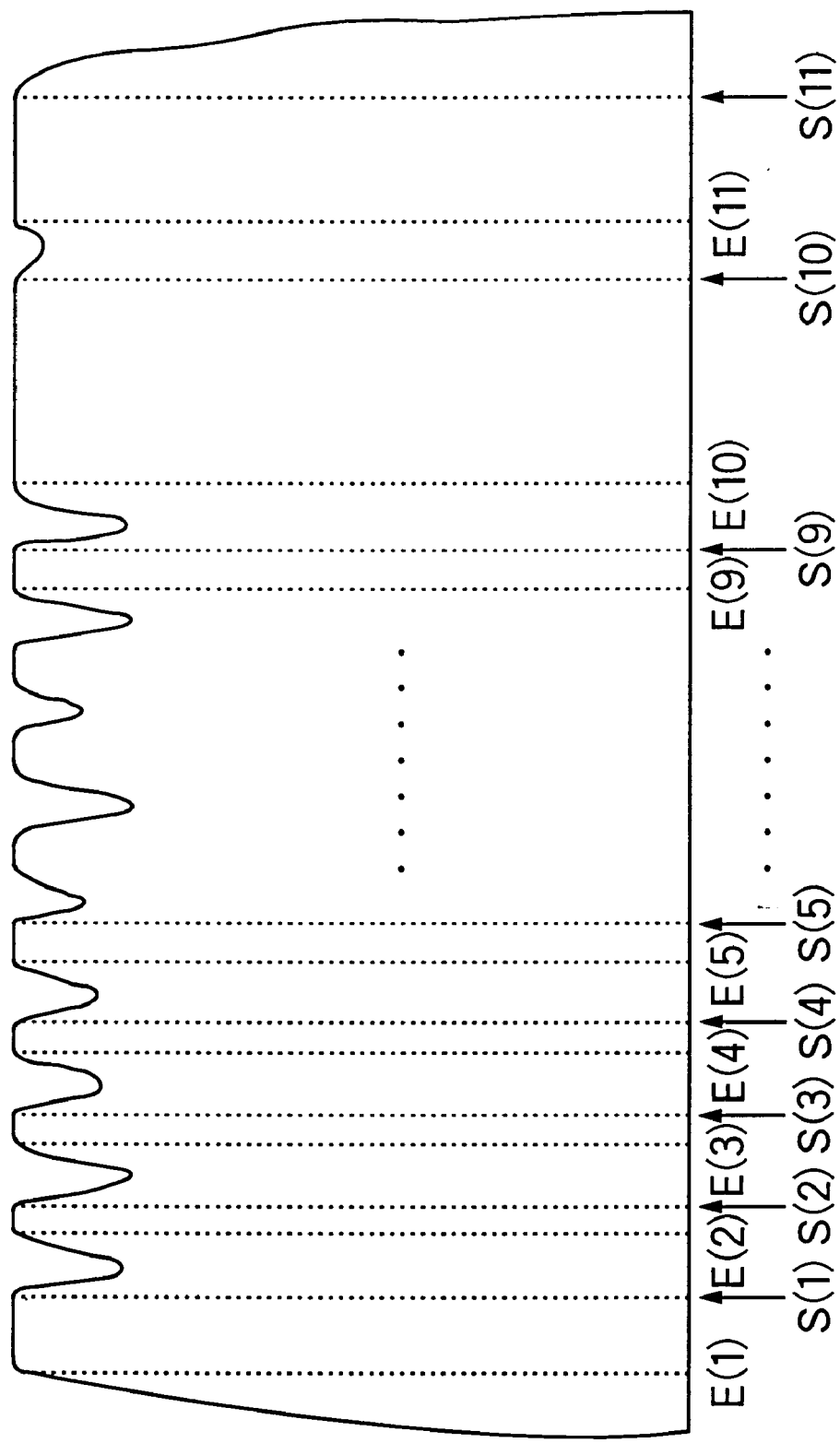
FIG. 11 is a view for describing a method for dividing lanes effected by a lane division processing section.

The lane end point detecting section 154 effects k-point smoothing differentiation on the x-axis direction peripheral distribution data in the same manner as the lane starting point detecting section 152 and determines the x-coordinates of points where the increase in the smoothed data ends, namely, where the smoothed data have become maximum. In this manner, as shown in FIG. 11, increase end points E(1) to E(11) are obtained.

The x-coordinates of the decrease starting points S(1) to S(11) calculated by the lane starting point detecting section 152 and the increase end points E(1) to E(11) calculated by the lane end point detecting section 154 are output to the lane defining coordinate calculating section 156. The lane defining coordinate calculating section 156 produces lane defining coordinates based on these data. A lane Ln is defined by lane defining coordinates S(n) and E(n+1). For example, in FIG. 11, lanes L1, L2 are respectively defined by the lane defining coordinates S(1) and E(2) and S(2) and E(3), and a lane L10 is defined by the lane defining coordinates S(10) and E(11).

Figure 12:
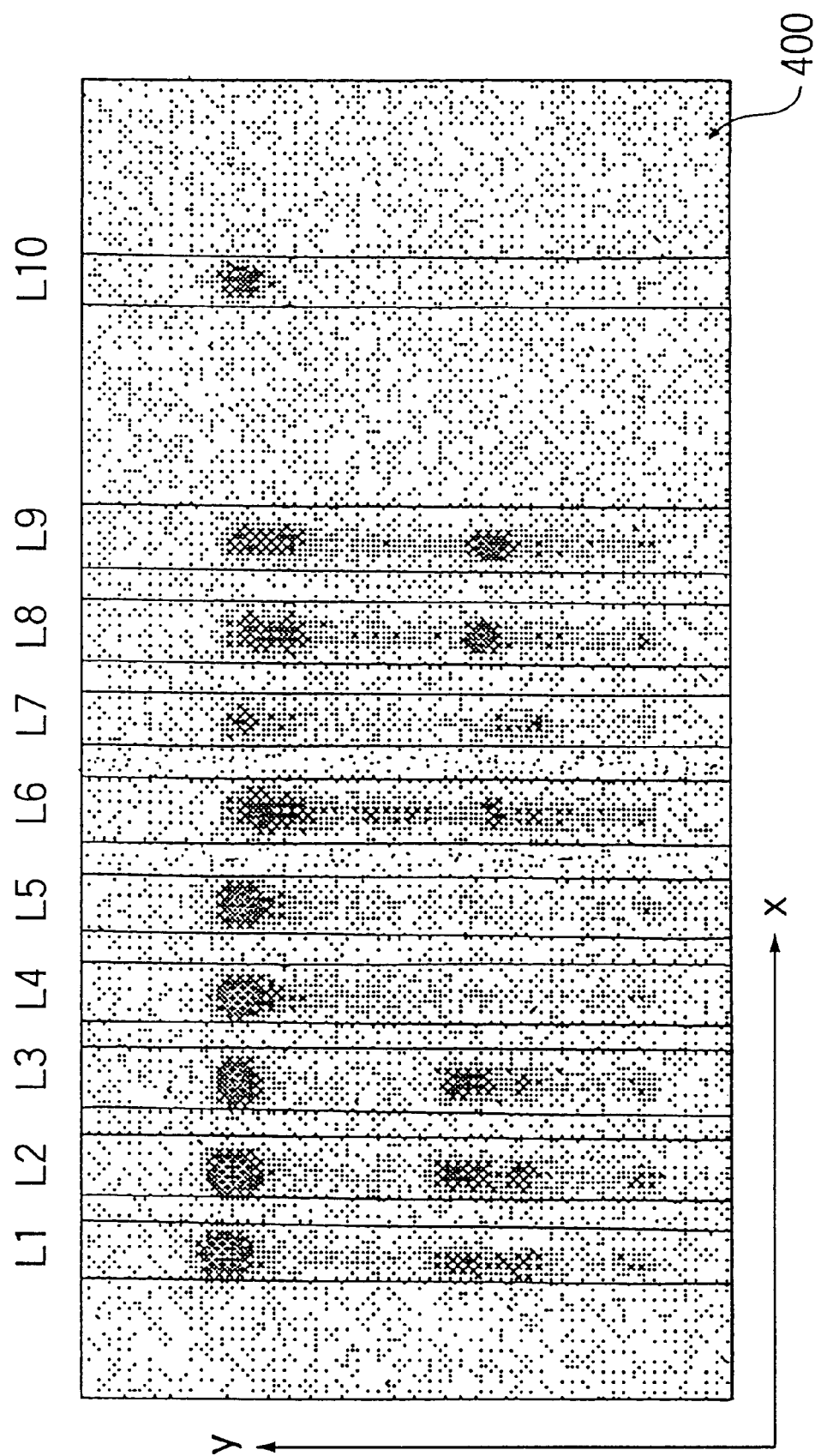
FIG. 12 is a view showing the screen of a CRT on which lanes formed by a lane division processing section are displayed.

When the lane defining coordinates have been produced and the lanes defining regions to be quantified in the x-axis direction have been defined by the lane defining coordinate calculating section 156, the lane defining coordinate calculating section 156 outputs the lane defining coordinate data to the data synthesizing section 118. The data synthesizing section 118 synthesizes the display image data input from the display image data producing section 102 and the lane defining coordinate data input from the lane defining coordinate calculating section 156 and outputs the thus synthesized data to the CRT 60 via the window memory 120. As a result, an image as shown in FIG. 12 is displayed on the screen 400 on the CRT 60.

Simultaneously, the lane defining coordinate calculating section 156 outputs the lane defining coordinates to the spot recognition processing section 108.

Figure 13:
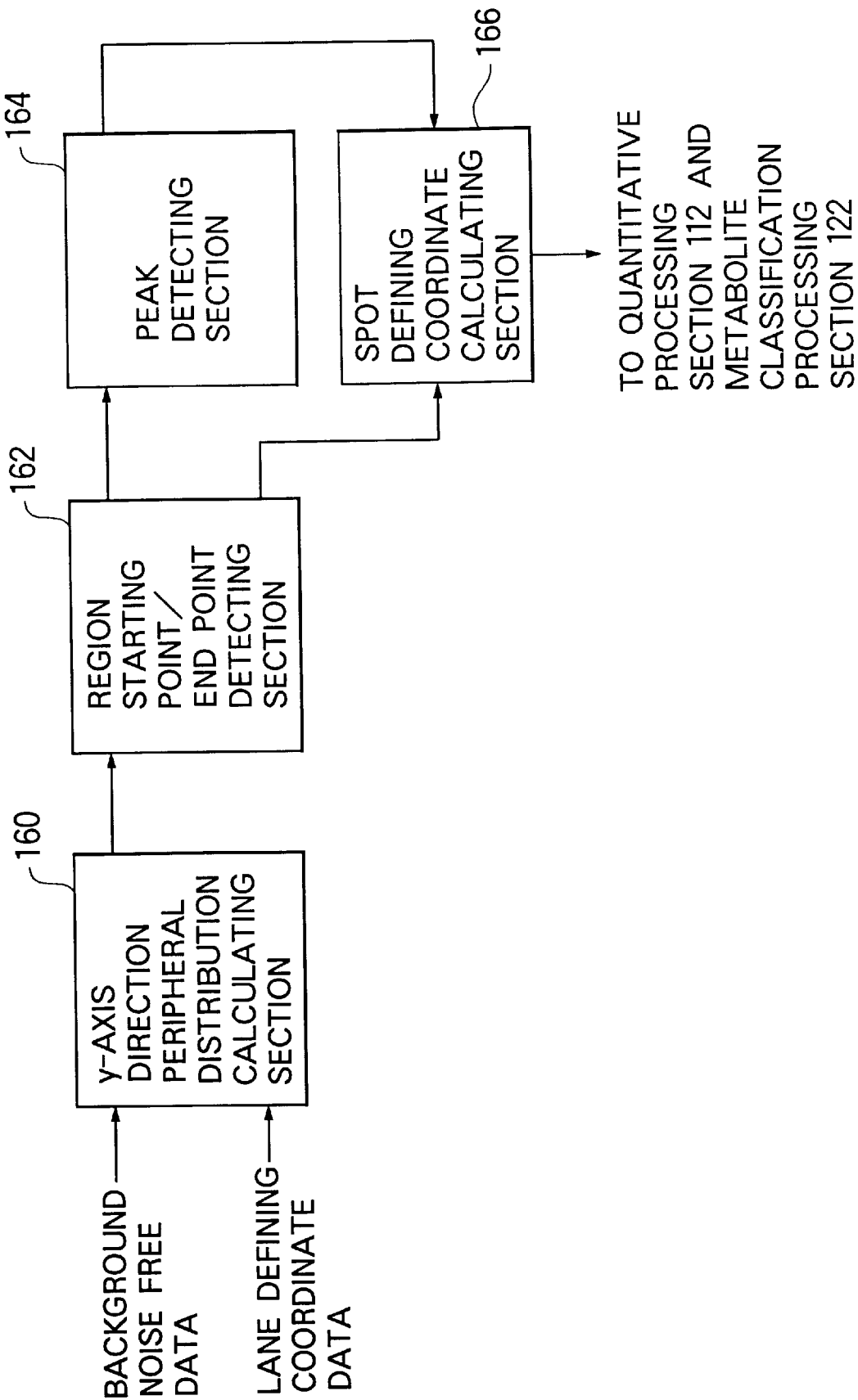
FIG. 13 is a block diagram showing a spot recognition processing section.

FIG. 13 is a block diagram showing the configuration of the spot recognition processing section 108. As shown in FIG. 13, the spot recognition processing section 108 comprises a y-axis direction peripheral distribution calculating section 160 for calculating the sum of the density data of pixels having the same y-coordinate in the planar coordinate system in which the display image data are mapped in each of the lanes and producing y-axis direction peripheral distribution data indicating the peripheral distribution of the density data in the y-axis direction, a region starting point/end point detecting section 162 for, based on the y-axis direction peripheral distribution data, detecting starting points and end points of regions in which spots are formed and define regions to be quantified in the y-axis direction, a peak value detecting section 164 for detecting maximal points in each region, and a spot recognition coordinate calculating section 166 for calculating coordinates of regions in which spots are formed based on the starting points, end points and maximal points.

Figure 14:
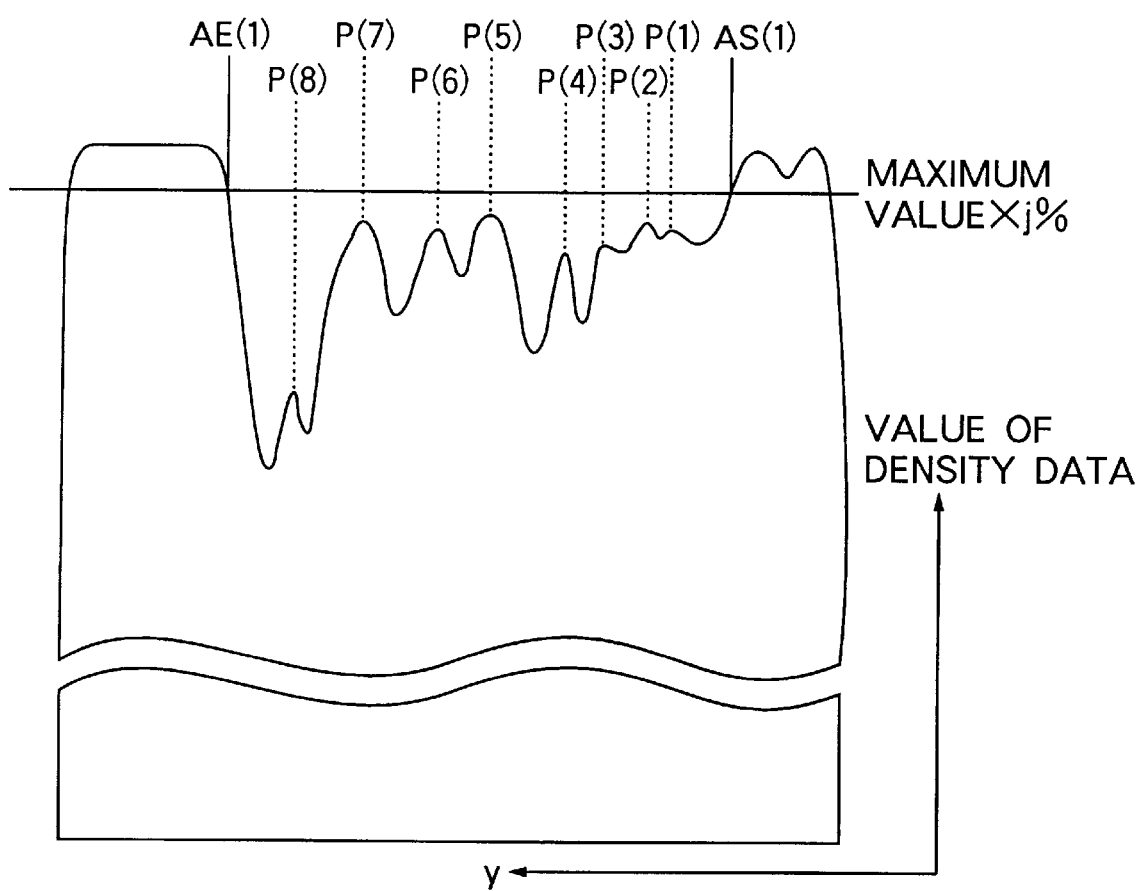
FIG. 14 is a graph showing periphery distribution data along the y-axis of a lane L6 shown in FIG. 12.

The y-axis direction peripheral distribution calculating section 160 sums up the density data values of pixels having the same y-coordinate in each of the lanes of the noise free image data in a similar manner to that in which the x-axis direction peripheral distribution calculating section 150 processed the noise free image data and effects low-pass filter processing on the thus obtained data for removing high frequency components, thereby producing the y-axis direction peripheral distribution data. FIG. 14 shows the y-axis direction peripheral distribution data of the lane L6 shown in FIG. 12.

Then, the region starting point/end point detecting section 162 calculates a value whose magnitude is "j" % of the maximum value of the y-axis direction peripheral distribution data and calculates region starting points AS where the value of the y-axis direction peripheral distribution data becomes smaller than "j" % of the maximum value and region end points AE where the value of the y-axis direction peripheral distribution data becomes greater than "j" % of the maximum value. For example, AS(1) and AE(1) are obtained for the peripheral distribution data of the lane L6, as shown in FIG. 14. The parameter "j" can be arbitrarily set using the input device 70. In this embodiment, "j" is set to be 95.

Further, the peak value detecting section 164 effects p-point smoothing differentiation on the y-axis direction peripheral distribution data in each region between the region starting point AS and the region end point AE. Then, the peak value detecting section 164 detects maximal points in the region based on the data processed with the p-point smoothing differentiation. In this embodiment, seven-point smoothing differentiation is effected. For example, in the case where AS(1) and AE(1) are obtained as the y-axis direction peripheral distribution data of the lane L6, as shown in FIG. 14, the maximal points P(1) to P(8) are detected.

In this manner, the data corresponding to the region starting point AS and the region end point AE obtained by the region starting point/end point detecting section 162 and the data corresponding to the maximal points P(1) to P(8) obtained by the peak value detecting section 164 are sent to the spot recognition coordinate calculating section 166.

Figure 15:
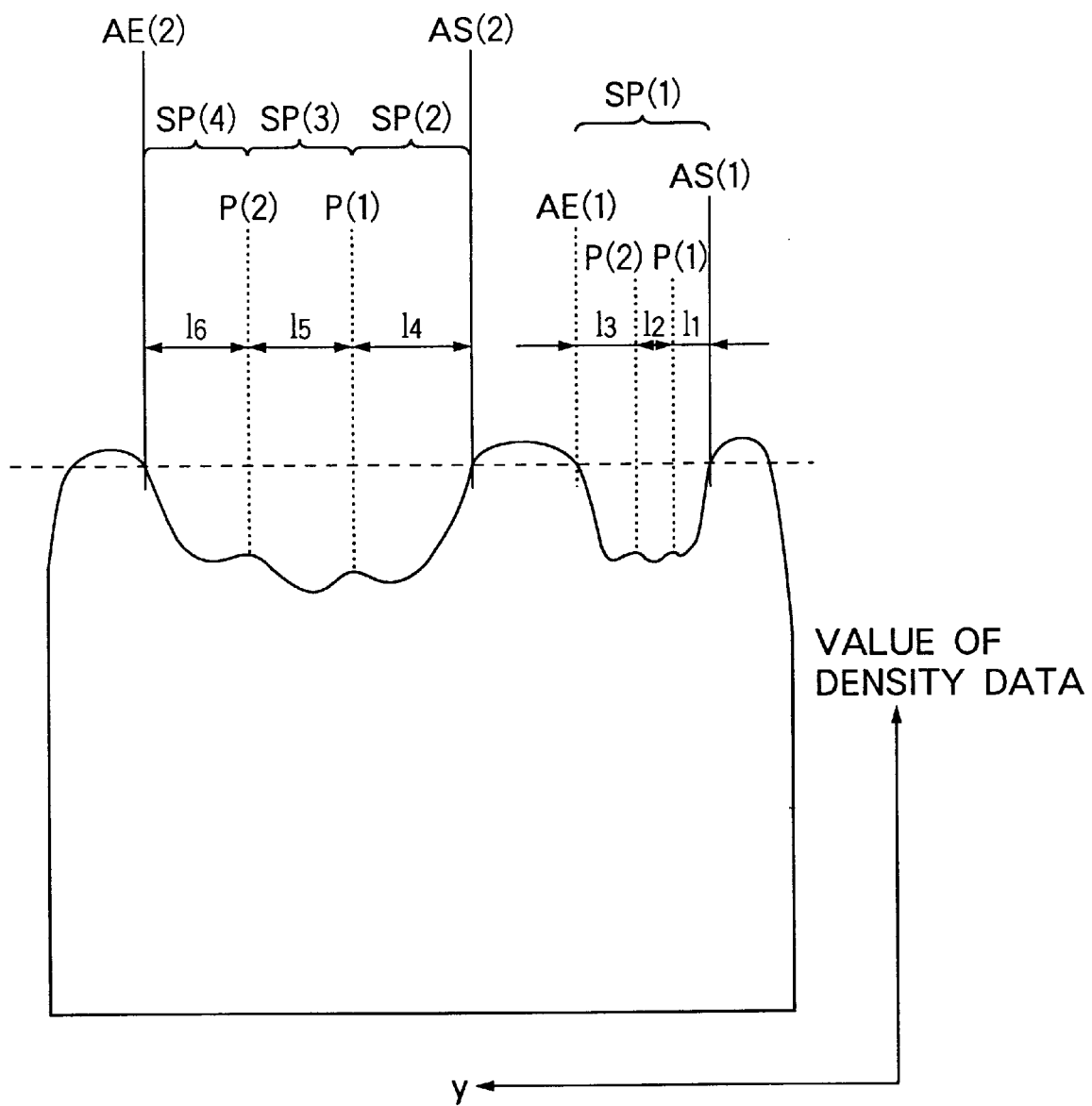
FIG. 15 is a view for describing processing effected by a spot coordinate calculating section.

The spot recognition coordinate calculating section 166 first calculates the distance between each region starting point and the maximal point adjacent thereto, the distance between each adjacent pair of maximal points adjacent and the distance between each region end point and the maximal point adjacent thereto. If the thus calculated distance is shorter than a threshold value "q" input from the input device 70, the spot recognition coordinate calculating section 166 does not recognize the region having the distance as a spot and on the other hand, if the thus calculated distance is equal to or longer than the threshold value "q", the spot recognition coordinate calculating section 166 recognizes the region having the distance as a spot. For example, in the case where, as shown in FIG. 15, the region starting point AS(1), the region end point AE(l) and the maximal points P(1) and P(2) therebetween are obtained and the region starting point AS(2), the region end point AE(2) and the maximal points P(1) and P(2) therebetween are obtained based on the y-axis direction peripheral distribution data, the spot recognition coordinate calculating section 166 calculates $1_1$, $1_2$, $1_3$, $1_4$, $1_5$ and $1_6$ therebetween in the y-axis direction. In this embodiment, the threshold value "q" is set to be 20. Therefore, if $1_1=11$, $1_2=12$, $1_3=16$, $1_4=110$, $1_5=100$ and $1_6=80$, since the distance between the region starting point AS(1) and the maximal point P(1), the distance between the maximal points P(1) and P(2) and the distance between the maximal point P(2) and the region end point AE(1) are smaller than the threshold value "q", the region between the region starting point AS(1) and the region end point AE(1) is recognized as a single spot SP(1) even though it contains the maximal points P(1) and P(2). On the other hand, since the distance between the region starting point AS(2) and the maximal point P(1), the distance between the maximal points P(1) and P(2) and the distance between the maximal point P(2) and the region end point AE(2) are equal to or longer than the threshold value "q", the region between the region starting point AS(2) and the maximal point P(1), the region between the maximal points P(1) and P(2) and the region between the maximal point P(2) and the region end point AE(2) are respectively recognized as a spot SP(2), a spot SP(3) and a spot (4). The spot recognition coordinate calculating section 166 produces spot region data consisting of the y-coordinates of the opposite ends of each of the thus defined spots and outputs them to the data synthesizing section 118.

Figure 16:
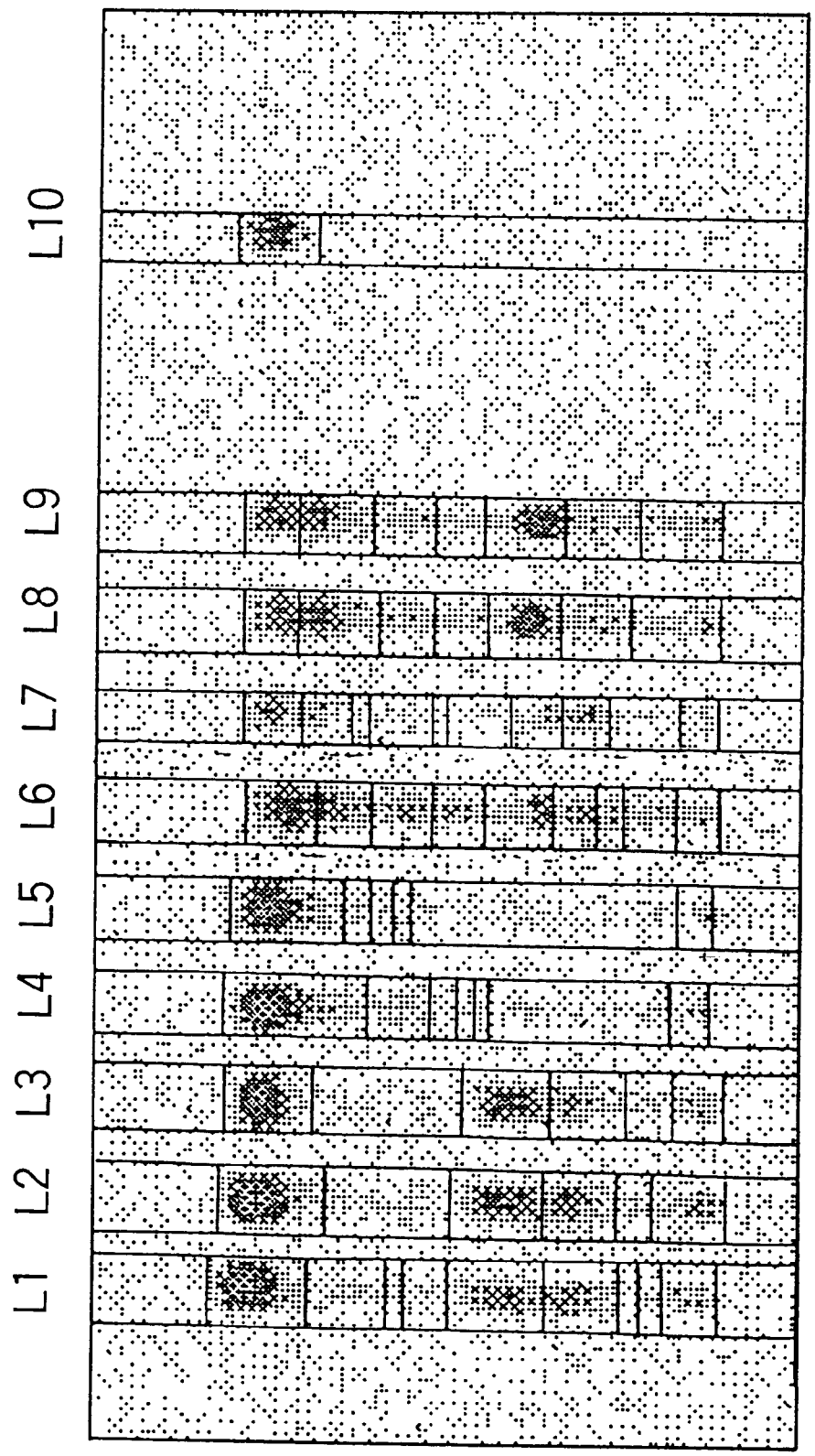
FIG. 16 is a view showing the screen of a CRT on which spots formed by a spot recognition processing section are displayed.

The data synthesizing section 118 synthesizes the display image data input from the display image data producing section 102, the lane defining coordinate data input from the lane defining coordinate data calculating section 156 and the spot region data input from the spot recognition coordinate calculating section 166 and outputs the synthesized data to the CRT 60 via the window memory 120. Thus, an image as shown in FIG. 16 is displayed on the screen 400 of the CRT 60.

Further, when data is input from the input device 70 to the data modifying section 110 by an operator, in accordance with the input data, the data modifying section 110 cancels a part of the spot region data produced by the spot recognition processing section 108, modifies one or both of the y-coordinates of the opposite ends of some spots or adds y-coordinates defining spots, thereby producing new spot region data. In the case where a part of the spot region data is canceled, the spot region data are modified or new spot region data are produced, an image is displayed on the screen of the CRT 60 in accordance with the thus modified spot region data.

Further, the spot region data are sent from the spot recognition coordinate calculating section 166 to the quantitative processing section 112 and the metabolite classification processing section 122. The quantitative processing section 112 calculates density data, namely, the amount of stimulated emission (photo-stimulated luminescence value: PSL value) from the stimulable phosphor sheet 1, of the pixels contained in each of the spots defined by the spot region data lane by lane defined by the lane defining coordinate data and stores the density data of each spot in a predetermined area of the quantitative database in the quantitative data storing section 114.

The metabolite classification processing section 122 produces center coordinate data indicating the center coordinate of each of the spots defined by the spot region data contained in lanes L1 to L9. Assuming that two y-coordinates constituting the spot region data corresponding to the "j"th spot in "i"th lane are termed as ys(i,j) and ye(i,j), the value of the center coordinate yc(i,j) can be termed as yc(i,j)={ys(i,j)−ye(i,j)}/2. After center coordinate of all spots in all lanes have been calculated, the metabolite classification processing section 122 determines the center coordinate having the smallest value among them and retrieves center coordinates corresponding to spots in other lanes within a distance r, from the thus obtained center coordinate. Then, the metabolite classification processing section 122 judges that the spots within this range represent the same metabolite and classifies these spots into a first group, thereby producing group data. Further, the metabolite classification processing section 122 determines the smallest center coordinate among the center coordinates of spots which do not belong to the first group and retrieves center coordinates corresponding to spots in other lanes within a distance $r_2$ from the thus obtained center coordinate. The metabolite classification processing section 122 judges that the spots within this range represent the same metabolite and classifies these spots into a second group, thereby producing group data. By repeating this process, first to "t" groups are formed and group data indicating spots belonging to the respective groups are produced. As described above, even if unevenness of the TLC plate causes the distributing rates of a distributing solvent to differ between lanes so that the positions of spots in different lanes deviate in the y-axis direction notwithstanding that the same substance was distributed, it is still possible to classify these spots into the same group to produce the group data by retrieving the center coordinates contained in a predetermined range from center coordinate having a predetermined value.

Figure 17:
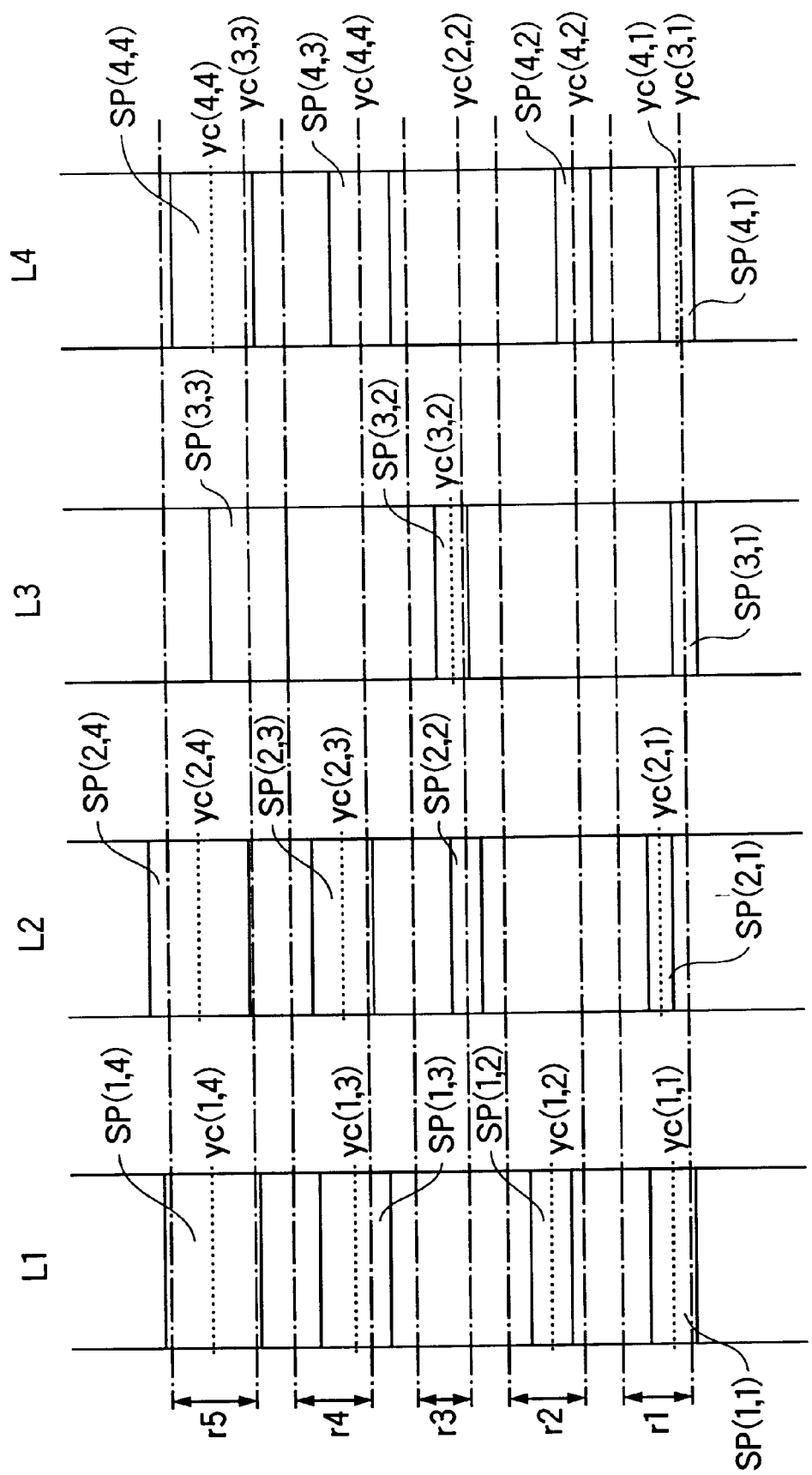
FIG. 17 is a view for describing processing effected by a metabolite classification processing section using an image displayed on the screen of a CRT.

FIG. 17 is a view for describing the processing effected by the metabolite classification processing section 122 using an image displayed on the screen of the CRT 60. As shown in FIG. 17, in the case where four lanes L1 to L4 are formed and a plurality of spots are formed in each, the metabolite classification processing section 122 retrieves center coordinates having values within $r_2$ from the center coordinate yc(3,1) having the smallest value among the center coordinates of the spots. In the case shown in FIG. 17, three of the center coordinates, yc(1,1), yc(2,1) and yc(4,1) have values within r, from the center coordinate yc(3,1). Therefore, the spot region data constituted by y-coordinates of the spots SP(1,1), SP(2,1), SP(3,1) and SP(4,1) corresponding to these center coordinates are classified into a first group.

Then, the metabolite classification processing section 122 retrieves the center coordinate having the smallest value among the center coordinates other than yc(1,1), yc(2,1), yc(3,1) and yc(4,1) and further retrieves the center coordinates having values within $r_2$ from this center coordinate. In the case shown in FIG. 17, yc(4,2) is the center coordinate having the smallest value and the center coordinate yc(1,2) has a value within $r_2$ from the center coordinate yc(4,2). Therefore, the spot region data constituted by y-coordinates of the spots SP(1,2) and SP(4,2) corresponding to these center coordinates are classified into a second group.

Similarly, when center coordinates are retrieved within $r_3$ from the center coordinate yc(2,2), only one center coordinate, yc(3,2) is found to have a value within the range. Therefore, the spot region data constituted by y-coordinates of the spots SP(2,2) and SP(3,2) corresponding to these center coordinate data are classified into a third group.

In a similar manner, the spot region data constituted by y-coordinates of the spots SP(1,3), SP(2,3) and SP(4,3) are classified into a fourth group and the spot region data constituted by y-coordinates of the spots SP(1,4), SP(2,4), SP(3,3) and SP(4,4) are classified into a fifth group.

The values $r_1$ to $r_3$ can be experimentally determined and input through the input device 70.

The group data produced by the metabolite classification processing section 122 in this manner are sent to the quantitative database in the quantitative data storing section 114.

FIG. 18 shows a memory map of the quantitative database in the quantitative data storing section 114. As shown in FIG. 18, the quantitative database includes coordinate data ys(i,j) and ye(i,j) for defining the "j"th spot in the "i"th lane, the density data yp(i,j) of the pixels contained in the spot and the group data indicating the group number of the group to which the spot SP(i,j) produced by the metabolite classification processing section 122 belongs.

As described above, the coordinate data and the density data of the spot SP(i,j) produced by the spot recognition processing section 108 or modified by the data modifying section 110 are sent to the quantitative database in the quantitative data storing section 114 via the quantitative processing section 112 and the group number of the group to which the spot SP(i,j) belongs is sent to the quantitative database from the metabolite classification processing section 122 as group data.

Based on the table data stored in the quantitative database in the quantitative data storing section 114, the table data producing section 116 produces ratios of the density data between spots, taking the sum of the density data of the spots having the same group number as 100, or ratios of the density data between spots, taking the sum of the density data of the spots formed in the same lane as 100, produces a table indicating such ratios, and outputs the table to the data synthesizing section 118.

The operation of the thus constituted autoradiographic image analyzing apparatus which is an embodiment of the present invention will now be described.

First, image data of a predetermined region are read from the image data storing section 52 of the image data storing means 50 by an operator operating the input device and inputting desired data.

Then, the image data read from the image data storing section 52 are enlarged or reduced by the display image data producing section 102 of the image forming/analyzing section 43 in accordance with the data input by the operator and are subjected to predetermined processing. The resultant display image data are sent to the data synthesizing section 118 and the background noise processing section 104. The values of the density data of the pixels constituting the display image data are converted by the contrast enhancement processing section 130 so as to enhance the contrast of the image, and density conversion image data is produced in accordance with a density conversion parameter "d" determined by the density conversion processing section 132 based on data input from the input device 70 for determining the density conversion parameter.

The density conversion image data produced by the density conversion processing section 134 are sent to the density isolation point removal processing section 136 and the background noise which would be displayed on the CRT 60 as black pixels even though no spot is formed in the region is removed in accordance with the parameters "m" and "f" obtained based on the data input through the input device 70, namely, the parameter "m" for determining the number of pixels constituting a rectangular region and the parameter "f" used for converting the values of the density data. In other words, density data of pixels which have values other than 255 even though they should be displayed on the CRT 60 as white pixels are converted to 255, whereby isolation points are removed.

Further, the data output from the density isolation point removal processing section 136 are binarized by the binarization processing section 140 and the binarized data are processed by the isolation point removal processing section 142 in accordance with parameters "n" and "h" obtained based on the data input through the input device 70, namely, the parameter "n" for determining the number of pixels constituting a rectangular region and the parameter "h" indicating the critical number of pixels so that the density data of pixels corresponding to the background can be converted to 255 and the isolation points can be removed.

Then, based on the binarized data output from the isolation point removal processing section 142 and the display image data, the interpixel calculating section 144 keeps the density data of a pixel at 255 when the value of the binarized data is 255 and allots the density data value of pixels of the corresponding display data to the pixel when the value of the binarized data is 0. As a result, pixels present in the background are displayed as white pixels and regions in which spots are formed can be clearly displayed on the screen 400 of the CRT 60.

The background noise free image data thus produced by the background noise processing section 104 are output to the lane division processing section 106. The x-axis direction peripheral distribution calculating section 150 of the lane division processing section 106 sums up the density data values of pixels having the same x-coordinate in the background noise free image data displayed on the screen of the CRT 60 and effects low-pass filter processing on the sums of the density data, thereby removing high frequency components. Further, the x-axis direction peripheral distribution calculating section 150 compares the value of the sums from which the high frequency components have been removed with a threshold value "i" and replaces the value of the sum with the threshold value "i" when it is greater than the threshold value "i", thereby producing x-axis direction peripheral distribution data.

The lane starting point detecting section 152 effects k-point smoothing differentiation on the x-axis direction peripheral distribution data output from the x-axis direction peripheral distribution calculating section 150 to calculate the x-coordinates of points where the values of the differentiated x-axis direction peripheral distribution data begin to decrease. On the other hand, the lane end point detecting section 154 effects k-point smoothing differentiation on the x-axis direction peripheral distribution data and calculates the x-coordinates of points where the increase in the values of the differentiated x-axis direction peripheral distribution data terminates, namely, where the values of the differentiated x-axis direction peripheral distribution data become maximum. As described above, in the case where the image shown in FIG. 10(*a*) is displayed on the screen of the CRT 60, decrease starting points S(1) to S(11) and increase end points E(1) to E(11) are obtained, as shown in FIG. 11.

Then, the lane defining coordinate calculating section 156 calculates lane defining coordinate data based on the decrease starting points detected by the lane starting point detecting section 152 and the increase end points detected by the lane end point detecting section 154. The lane defining coordinate data consists of coordinates corresponding to the decrease starting points S(n) and the increase end points E(n+1), and the "n"th lane is defined thereby.

In the case where the image shown in FIG. 10(*a*) is displayed on the screen of the CRT 60, ten lanes L1 to L10 are formed, as shown in FIG. 12.

The lane defining coordinates produced by the lane defining coordinate calculating section 156 are sent to the spot recognition processing section 108. The y-axis direction peripheral distribution calculating section 160 of the spot recognition processing section 108 sums up the density data values of pixels having the same whose y-coordinate based on the background noise free image data. For example, in the case where ten lanes L1 to L10 are formed as shown in FIG. 12, the y-axis direction peripheral distribution calculating section 160 first sums up the values of the density data of pixels having the same y-coordinate at every y-coordinate in the lane L1. The y-axis direction peripheral distribution data for all lanes are produced by processing the lanes L2 to L10 in the same manner.

The y-axis direction peripheral distribution data for each lane are sent to the lane starting point/end point detecting section 162. Based on the parameter "j" input from the input device 70, the lane starting point/end point detecting section 162 calculates region starting points AS where the y-axis direction peripheral distribution data for each lane become smaller than their maximum value×"j" % and region end points AE where the y-axis direction peripheral distribution data for each lane become greater than their maximum value×"j" %. As shown in FIG. 12, in the case where ten lanes L1 to L10 are formed, at least one set consisting of a region starting point AS and a region end point AE is calculated for each lane.

The data corresponding to the region starting point AS and the region end point AE for each lane are sent to the peak value detecting section 164. The peak value detecting section 164 effects p-point smoothing differentiation on the y-axis direction peripheral distribution data contained in regions between the region starting point AS and the region end point AE, lane by lane, and detects maximal points present in the regions based on the differentiated data.

The data corresponding to the region starting point AS and the region end point AE detected by the lane starting point/end point detecting section 162 and the data corresponding to the maximal points detected by the peak value detecting section 164 are sent to the spot recognition coordinate calculating section 166.

Based on the input data, the spot recognition coordinate calculating section 166 calculates spot region data constituted of the y-coordinates of the opposite ends of the spots defined in each lane. The spot region data are sent to the data synthesizing section 118 and an image such as shown in FIG. 16 is displayed on the screen 400 of the CRT 60. Further, in the case where the data modifying section 110 is operated by data input from the input device 70, the spot region data are modified based on the input data.

The spot region data are also sent to the quantitative processing section 112 and the metabolite classification processing section 122. The quantitative processing section 112 calculates the density data of the pixels contained in each of the spots, lane by lane, and outputs them to the quantitative database in the quantitative data storing section 114. For example, the density data of pixels contained in a first spot SP(1,1) in the first lane are stored in an area 181 shown in FIG. 18 and the density data of pixels contained in the second spot SP(1,2) in a second lane are stored in an area 182.

The metabolite classification processing section 122 produces group data indicating what group each of the spots formed in each of the lanes belongs to and outputs them to the quantitative database in the quantitative data storing section 114. The group data indicating the group to which the first spot SP(1,1) in the first lane belongs are stored in an area 191 shown in FIG. 18 and the group data indicating the group to which the second spot SP(1,2) in the second lane belongs are stored in an area 192. Therefore, it is possible to classify the spots of the autoradiographic image obtained from the same metabolite into the same group. Further, by correcting the parameters $I_1$, $I_2$ and the like based on data input from the input device 70, it is possible to compensate for errors which arise for various reasons in the positions where the spots are formed when chromatographically distributing specimens.

Moreover, when an operator inputs predetermined data through the input device 70, the table data producing section 116 reads data stored in the quantitative database in the quantitative data storing section 114 and produces, as described above, based on the input data, ratios of density data values between the spots having the same group number, taking the total value of the density data values of the spots having the same group number as 100, or ratios of density data values between the spots in the same lane, taking the total value of the density data value of the spots in the same lane as 100, thereby producing table data indicating these ratios. For example, in the case where the data shown in FIG. 18 are stored in the quantitative database, the table data producing section 116 sums up the values of density data yp(1,1), yp(2,1), yp(3,1) and the like of the spots SP(1,1), SP(2,1), SP(3,1) and the like belonging to group number 1 and produces table data indicating the ratios between the values of density data yp(1, I), yp(2,1), yp(3,1) and the like taking the sum of the values of the density data as 100. It is of course possible to produce table data indicating ratios of density data values of spots belonging to other group numbers.

The table data produced by the table data producing section 116 are output to the data synthesizing section 118 and sent therefrom to the CRT 60 via the window memory 120, whereby a table corresponding to the table data is displayed on the screen of the CRT 60.

According to the above described embodiment, the background noise processing section 104 produces background noise free image data by removing data corresponding to background noise from the display image data produced by the display data producing section 102. The lane division processing section 106 determines lane defining regions to be quantified in the x-axis direction by dividing the background noise free image data in the x-axis direction of the planar coordinate system in which the display image data are mapped. Further, the spot recognition processing section 108 determines spots defining regions to quantified in the y-axis direction by dividing the background noise free image data, lane by lane, in the y-axis direction of the planar coordinate system in which the display image data are mapped. Therefore, it is possible to define regions to be quantified without requiring an operator to conduct complicated operations.

Figure 19:
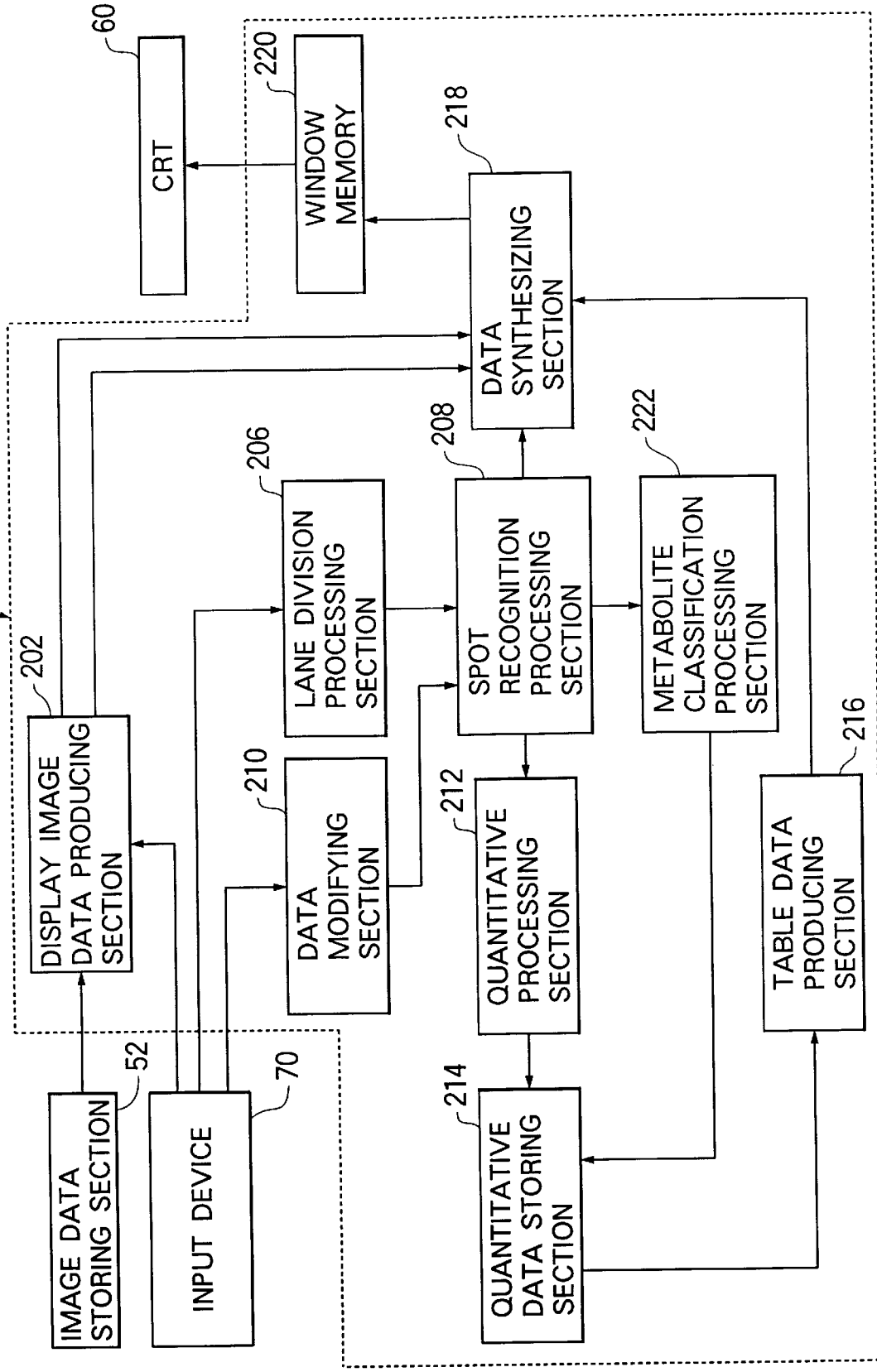
FIG. 19 is a block diagram showing an image forming/analyzing section of an autoradiographic image analyzing apparatus which is another embodiment of the present invention.

FIG. 19 is a block diagram showing an image forming/analyzing section of an autoradiographic image analyzing apparatus which is another embodiment of the present invention.

In this embodiment, processing time is shortened by eliminating the processing for removing background noise and, therefore, the background noise processing section 104 is not provided.

Figure 20:
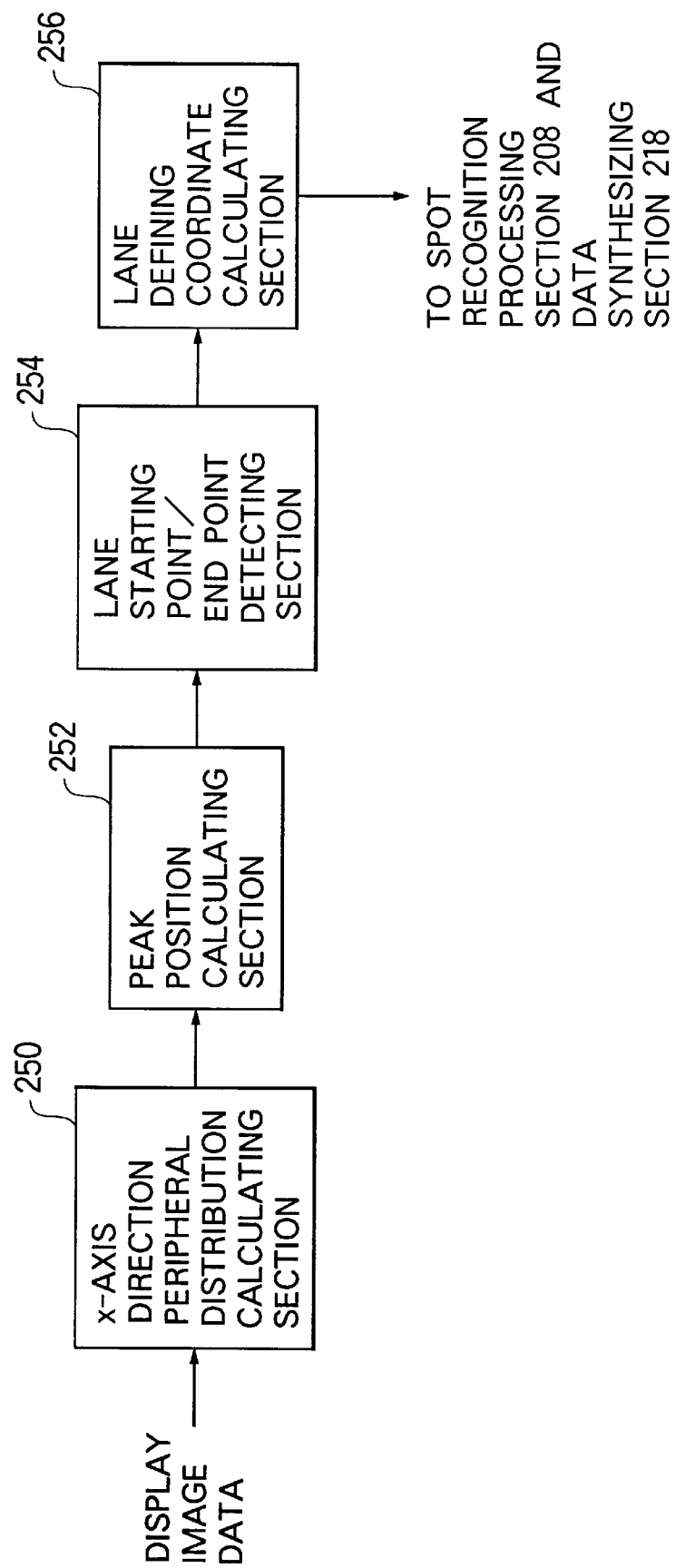
FIG. 20 is a block diagram showing a lane division processing section for defining lanes forming regions to be quantified in the x-axis direction.

FIG. 20 is a block diagram showing the configuration of a lane division processing section 206 for defining lanes indicating regions to be quantified in the x-axis direction.

As shown in FIG. 20, the lane division processing 206 comprises an x-axis direction peripheral distribution calculating section 250 for calculating the sum in the y-axis direction of the density data of pixels having the same x-coordinate in the planar coordinate system in which the display image data are mapped and producing x-axis direction peripheral distribution data indicating the peripheral distribution of the data values in the x-axis direction. In this embodiment, the x-axis direction peripheral distribution calculating section 250 is constituted so as to produce the x-axis direction peripheral distribution data in opposite sign to the previous embodiment. The lane division processing section 206 further comprises a peak position calculating section 252 for, based on the x-axis direction peripheral distribution data, calculating peak positions giving peak values of the density data of the x-axis direction peripheral distribution data, a lane starting point/end point detecting section 254 for, based on the peak positions calculated by the peak position calculating section 252, detecting starting points and end points of lanes defining regions to be quantified and containing a plurality of spots, and a lane defining coordinate calculating section 256 for, based on the data detected by the lane starting point/end point detecting section 254, producing lane defining coordinates for defining lanes in which spots are formed.

Figure 21:
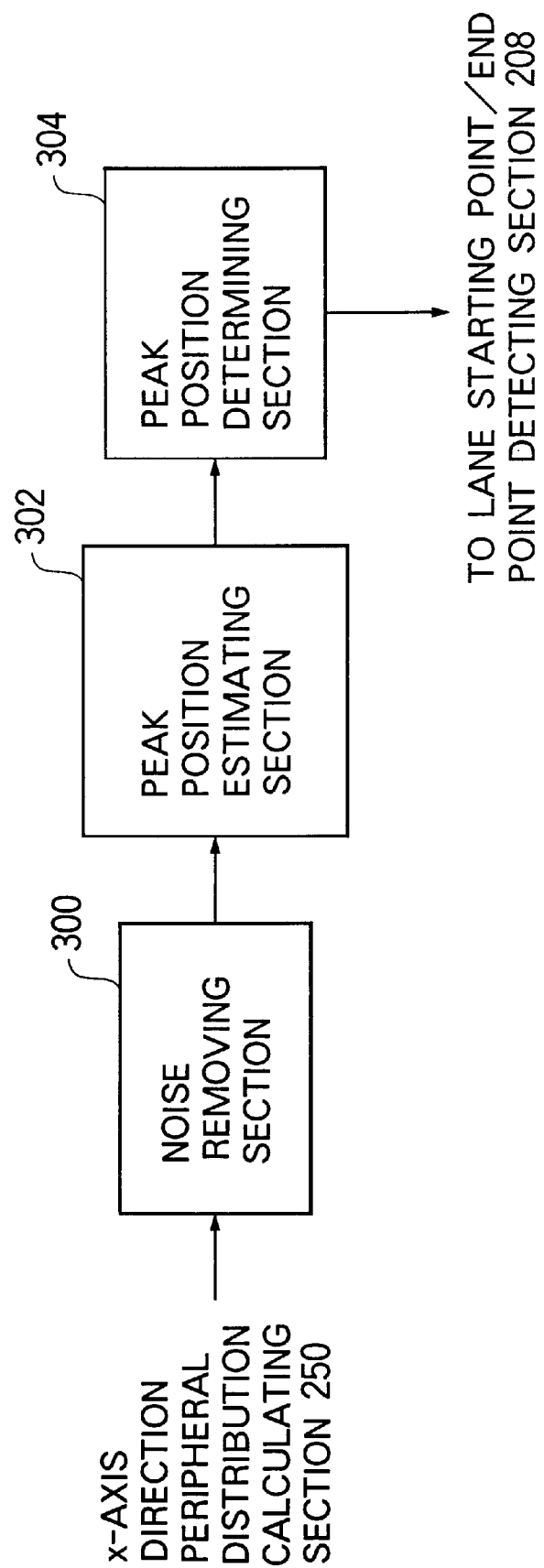
FIG. 21 is a block diagram showing a peak position calculating section.

FIG. 21 is a block diagram showing the peak position calculating section 252.

As shown in FIG. 21, the peak position calculating section 252 comprises a noise removing section 300 for removing noise from the x-axis direction peripheral distribution data calculated by the x-axis direction peripheral distribution calculating section 250, a peak position estimating section 302 for effecting one-dimensional Fourier transform on the x-axis direction peripheral distribution data from which noise has been removed and estimating positions of peaks, and a peak position determining section 304 for determining positions of peaks based on the positions of peaks estimated by the peak position estimating section 302.

Figure 22:
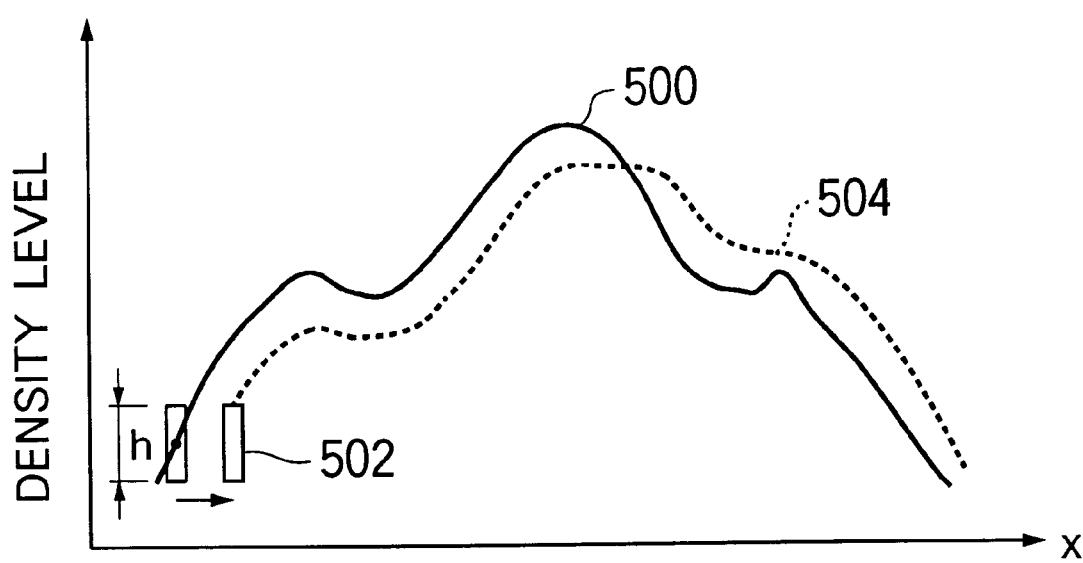
FIG. 22 is a view for describing a method of histogram smoothing processing.

In the noise removing section 300, the x-axis direction peripheral distribution data calculated by the x-axis direction peripheral distribution calculating section 250 are subjected to low-pass filter processing, thereby removing high frequency components. Since noise contained in image data often appear as small density data fluctuations, the data are subjected to hysteresis smoothing processing for removing the density data fluctuations. FIG. 22 shows a method of the hysteresis smoothing processing. As shown in FIG. 22, in the hysteresis smoothing processing, a cursor 502 having a height of "h" is moved along the waveform 500 of the input x-axis direction peripheral distribution data and the input waveform 500 of the x-axis direction peripheral distribution data is obtained as the locus of the center point of the cursor 502. More specifically, the cursor 502 is moved by one step in the x-axis direction and it is judged whether the input waveform 500 and the cursor intersect. If they intersect, the cursor 502 is again moved by one step in the x-axis direction. If the input waveform 500 and the cursor do not intersect and the input waveform 500 is above the upper end portion of the cursor 502, the cursor 502 is moved so that the upper end portion of the cursor 502 coincides with the input wave from 500. On the other hand, when the input waveform 500 is below the lower end portion of the cursor 502, the cursor 502 is moved so that the lower end portion of the cursor 502 coincides with the input wave from 500. Then, the cursor 502 is further moved by one step in the x-axis direction. By repeating these operation and determining the locus of the cursor 502, it is possible to obtain a smoothed output waveform 504 removed of fluctuations of the input waveform smaller than "h". Since the phase of the thus obtained output waveform 504 deviates with respect to the input waveform 500 as shown in FIG. 22, the noise removing section 300 further effects low-pass filter processing from the reverse direction on the output waveform 504 to correct the deviation in phase.

Figure 23:
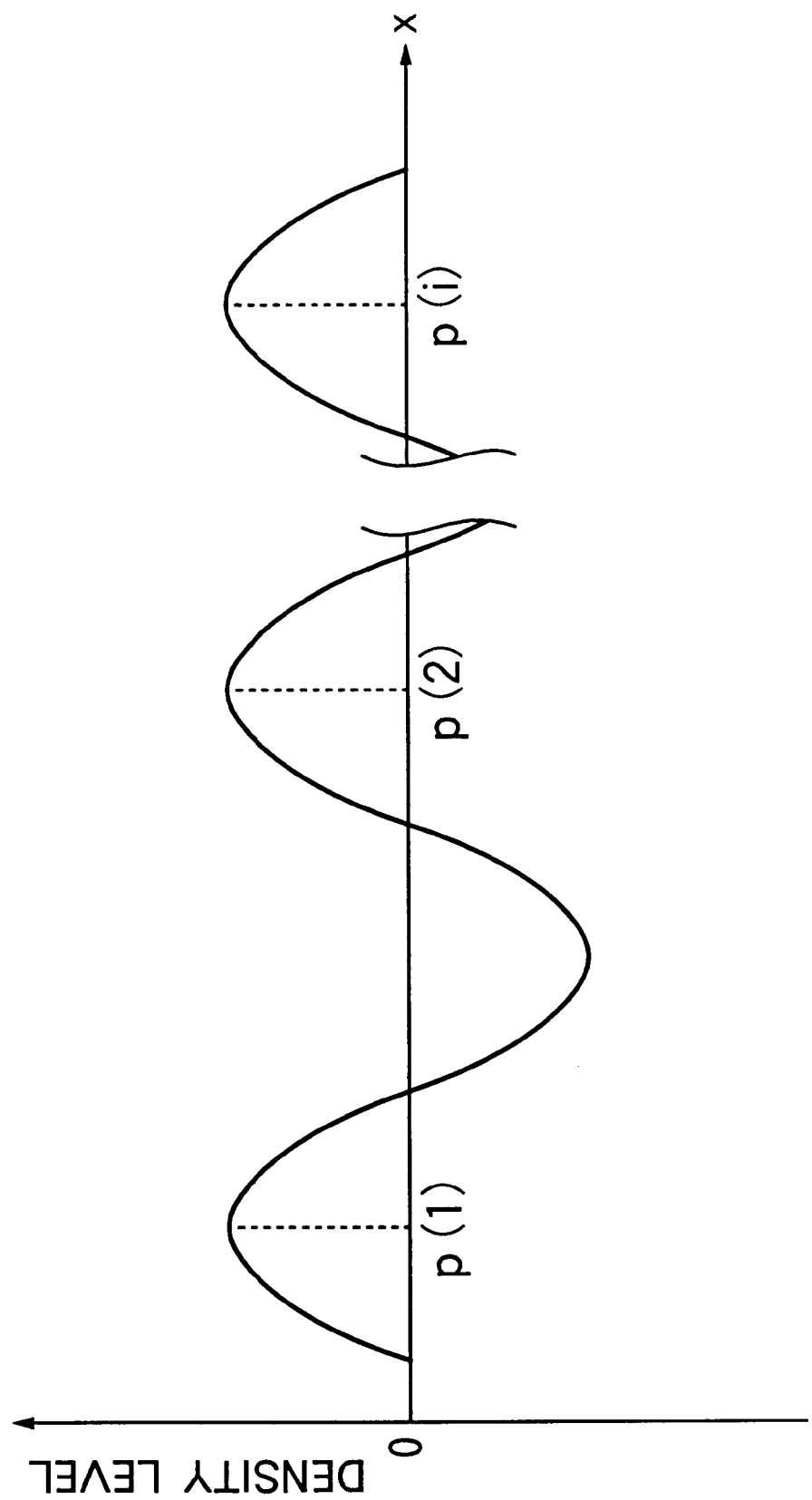
FIG. 23 is a view for describing processing effected by a peak position estimating section.

In this manner, x-axis direction peripheral distribution data from which noise has been removed by the noise removing section 300 are input to the peak position estimating section 302. In the peak position estimating section 302, the x-axis direction peripheral distribution data are subjected to one-dimensional Fourier transform and a plurality of sine waves are obtained. Since the sine wave having the maximum amplitude among the thus obtained sine waves can be considered to be the main wave component of the x-axis direction peripheral distribution data, among the plurality of sine wave obtained, the peak position estimating section 302 selects the sine wave which has the maximum amplitude, is estimated to have the x-axis direction peripheral distribution data and has a number of peaks equal to or greater than that input from the input device 70 by an operator. The peak position estimating section 302 further determines positions p(1) to p(i) of the thus selected sine wave based on the phase and frequency thereof, as shown in FIG. 23, and outputs then to the peak position determining section 304.

Figure 24:
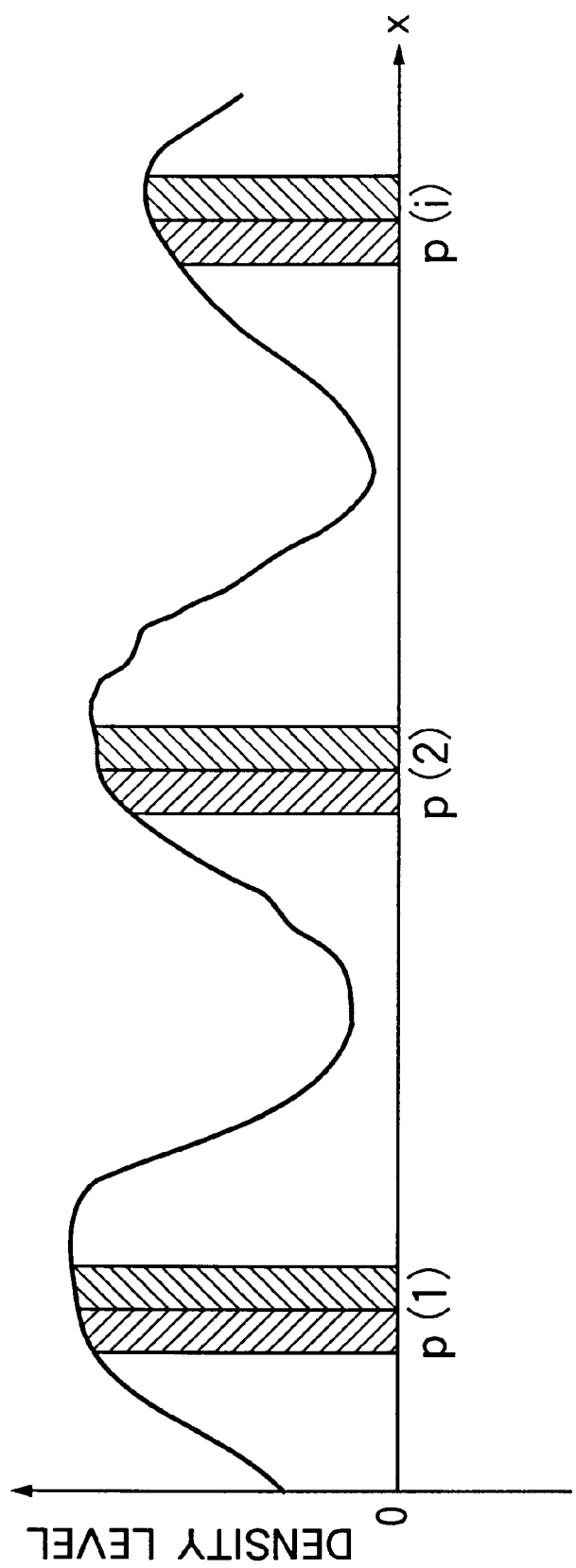
FIG. 24 is a view for describing processing effected by a peak position determining section.

Since the thus determined positions p(1) to p(i) of the sine wave are merely those of peaks of the sine wave which can be considered to be the main wave component of the x-axis direction peripheral distribution data, the peak positions do not necessarily coincide with the actual positions of the x-axis direction peripheral distribution data. Therefore, as shown in FIG. 24, the peak position determining section 304 calculates areas of the x-axis direction peripheral distribution data within a predetermined width centered on the peak positions corresponding to the input peak positions p(1) to p(i) and provisionally defines the positions where the areas are maximum as peaks of the x-axis direction peripheral distribution data.

Depending on the waveform of the x-axis direction peripheral distribution data, the thus determined positions of the adjacent peaks may be too close to each other. In such a case, since some of them can be considered to have been recognized as a peak even though not actually a peak, the peak position determining section 304 recognizes the peak having the smallest phase as a peak when two or more peaks are recognized within a predetermined cycle, for example, a quarter of one cycle of the selected sine wave.

Figure 25:
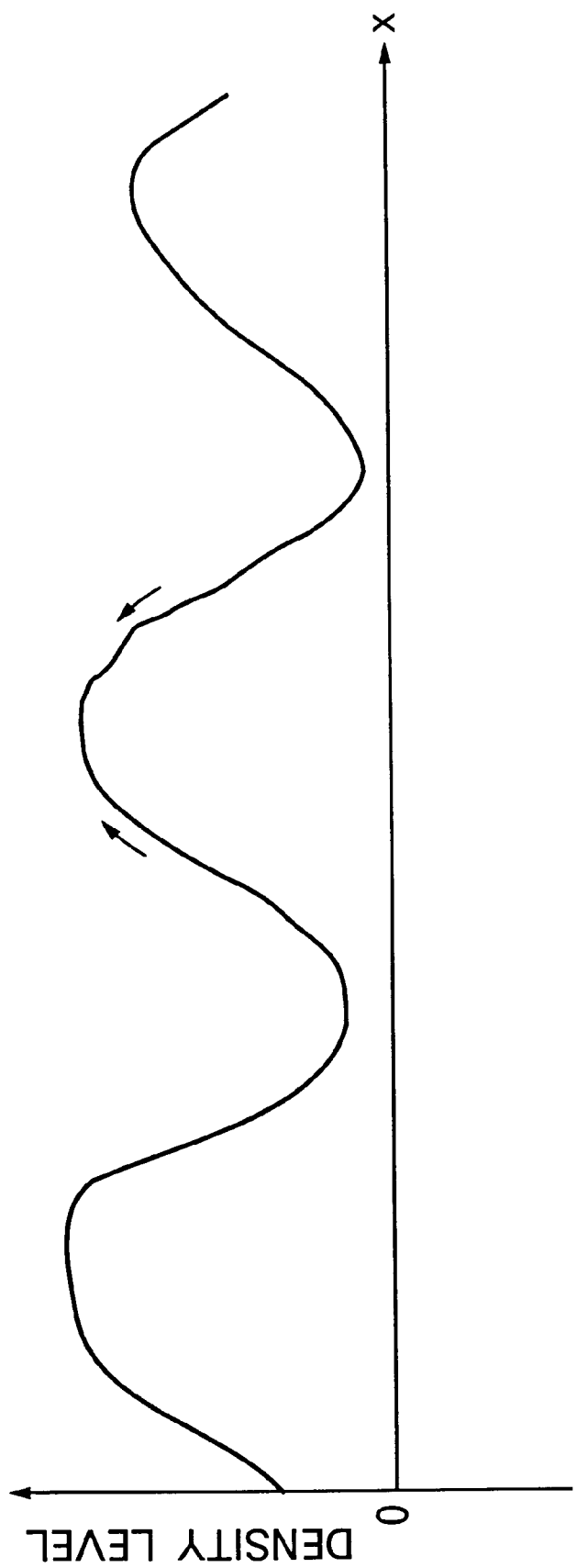
FIG. 25 is a view for describing processing effected by a peak position determining section.

Since as described above, the peak position determining section 304 determines peaks of the x-axis direction peripheral distribution data based on areas within a predetermined width of the x-axis direction peripheral distribution data, there may be unrecognized peaks whose density data are small. Therefore, as shown in FIG. 25, the peak position determining section 304 judges whether there are portions where the density data continuously increase over a predetermined number of pixels, for example, five pixels from both the right and left peaks and if there are such portions, it judges that there are peaks at midpoints between the portions where the increase in the density data starts.

The peak values of the x-axis direction peripheral distribution data thus calculated by the peak position calculating section 252 are input to the lane starting point/end point detecting section 254.

Figure 26:
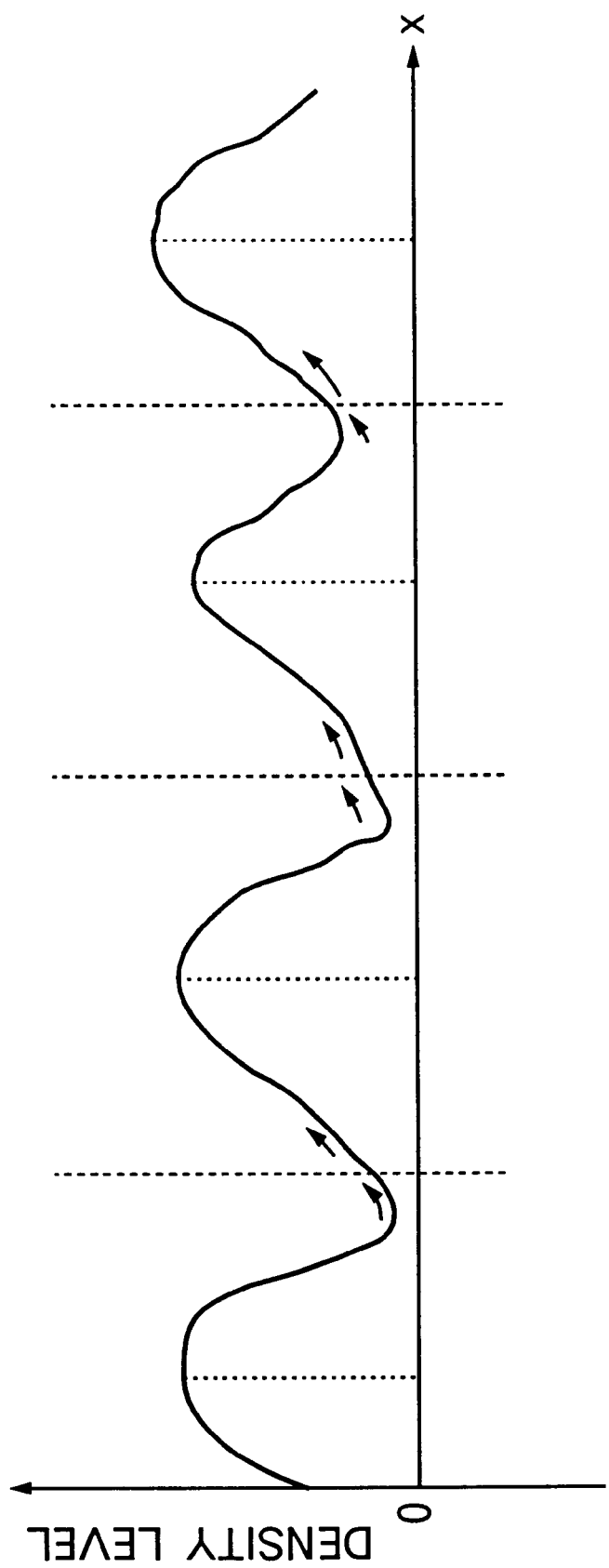
FIG. 26 is a view for describing processing effected by a lane starting point/end point detecting section.

The lane starting point/end point detecting section 254 determines midpoints between the peaks based on the peak values of the x-axis direction peripheral distribution data input from the peak position calculating section 252 and, as shown in FIG. 26, it determines lane starting points and lane end points where the density data begin to continuously increase between the adjacent midpoints and outputs them to the lane defining coordinate calculating section 256.

Based on the data input from the lane starting point/end point detecting section 254, the lane defining coordinate calculating section 256 produces lane defining coordinates for defining regions in which spots are formed in the same manner as in the previous embodiment.

When the lane defining coordinates have been produced by the lane defining coordinate calculating section 256, whereby lanes that are regions to be quantified in the x-axis direction are defined, the lane defining coordinates are output to the data synthesizing section 118. The data synthesizing section 118 synthesizes the display image data and the lane defining coordinates and sends the synthesized data to the CRT 60 via the window memory 120. As a result, an image as shown in FIG. 12 is displayed on the screen 400 of the CRT 60.

The lane defining coordinates are also sent to the spot recognition processing section 208.

Figure 27:
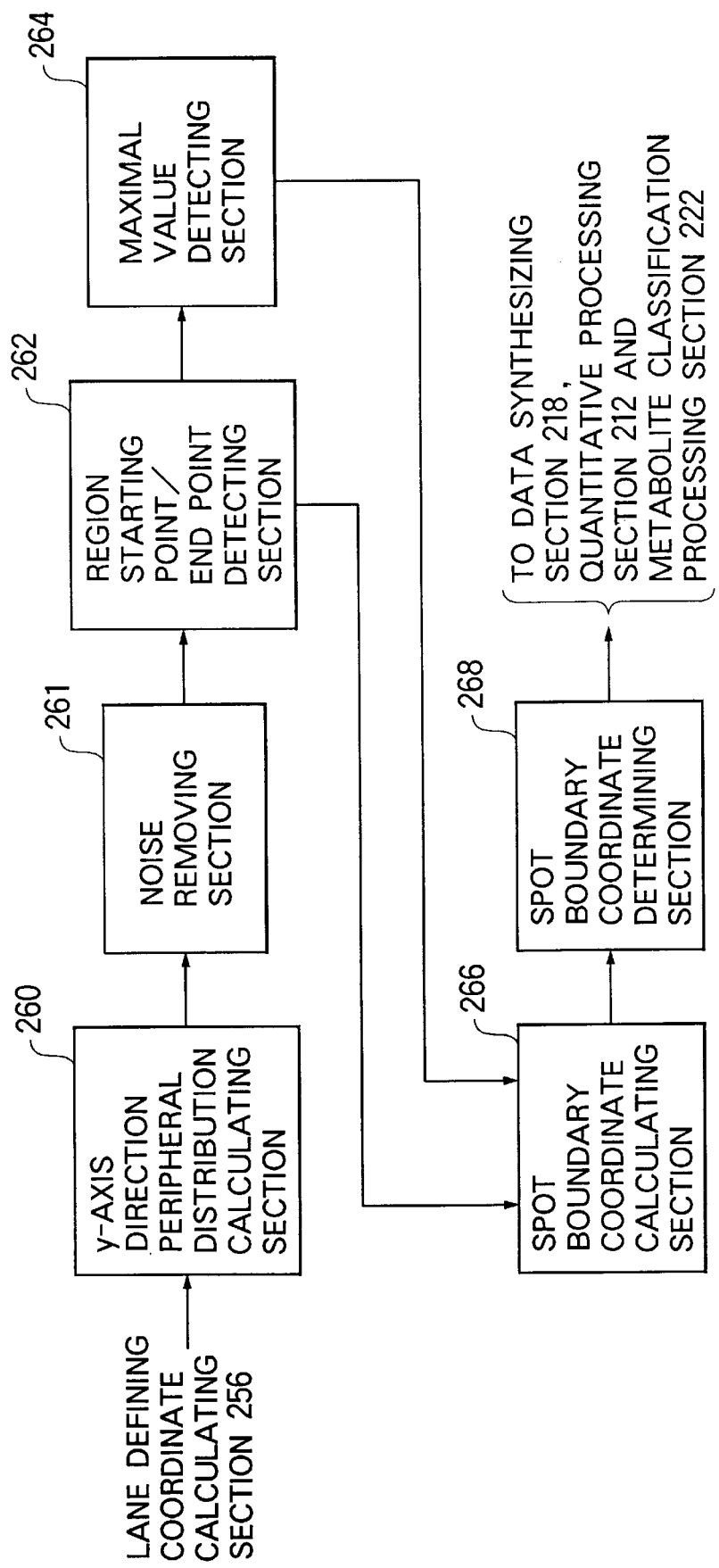
FIG. 27 is a block diagram showing a spot recognition processing section.

FIG. 27 is a block diagram showing the configuration of the spot recognition processing section 208.

As shown in FIG. 27, the spot recognition processing section 208 comprises a y-axis direction peripheral distribution calculating section 260 for calculating y-axis direction peripheral distribution data indicating the peripheral distribution of the density data values in the y-axis direction by, in each lane, calculating the sum in the x-axis direction of the density data of pixels having the same whose y-coordinate in the planar coordinate system in which the display image data are mapped, a noise removing section 261 for removing noise components of the y-axis direction peripheral distribution data calculated by the y-axis direction peripheral distribution calculating section 260, a region starting point/end point detecting section 262 for detecting starting points and end points of regions in which spots defining regions to be quantified in the y-axis direction are formed, a maximal point detecting section 264 for detecting maximal points present in the detected regions, a spot defining coordinate calculating section 266 for calculating coordinates of boundaries of adjacent spots within the regions in which spots are formed based on the starting points, the end points and the maximal points, and a spot boundary coordinate determining section 268 for determining coordinates of boundaries of adjacent spots within the regions in which spots are formed based on the coordinates of boundaries of adjacent spots calculated by the spot defining coordinate calculating section 266.

In the same manner as in the previous embodiment, the y-axis direction peripheral distribution calculating section 260 calculates y-axis direction peripheral distribution data indicating the peripheral distribution of the density data values in the y-axis direction by calculating the sum in the x-axis direction of the density data of pixels having the same y-coordinate in the planar coordinate system in which the display image data are mapped and the noise removing section 261 removes noise components in the y-axis direction by summing up the density data calculated by the y-axis direction peripheral distribution calculating section 260.

Then, in the same manner as in the region starting point/end point detecting section 162 in the previous embodiment, the region starting point/end point detecting section 262 calculates region starting points AS and region end points AE based on the y-axis direction peripheral distribution data from which noise components have been removed.

Further, the maximal point detecting section 264 effects p-point smoothing differentiation on the peripheral data contained in regions between the region starting points AS and the region end points AE and detects maximal points present in the regions from the data which have been subjected to the p-point smoothing differentiation. As in the previous embodiment, seven-point smoothing differentiation is also effected in this embodiment.

The data corresponding to the region starting points AS and the region end points AE detected by the region starting point/end point detecting section 262 and the data corresponding to the maximal points detected by the maximal point detecting section 264 are sent to the spot defining coordinate calculating section 266.

In this embodiment, as in the previous embodiment, a pixel having density data of 0 is displayed on the screen of the CRT 60 as a black pixel and a pixel having density data of 255 is displayed as a white pixel. Therefore, the coordinates of the region starting points AS and the region end points AE and the maximal points can be estimated to correspond to the coordinates of spot boundaries. The spot defining coordinate calculating section 266 therefore detects the coordinates of the region starting points AS and the region end points AE obtained by the region starting point/end point detecting section 262 and the coordinates of the maximal points obtained by the maximal point detecting section 264 as boundary coordinate values corresponding to the boundaries of the adjacent spots and outputs them to the spot boundary coordinate determining section 268.

However, since the thus obtained boundary coordinates have been merely determined as the coordinates of the region starting points AS and the region end points AE and the maximal points, spots are not necessarily present therebetween and only slight changes in the density data caused by noise might be present. Therefore, since the thus obtained boundary coordinates cannot be immediately considered to be boundary coordinates of the spots, the spot boundary coordinate determining section 268 effects p-point smoothing differentiation on the y-axis direction peripheral distribution data within the regions between the boundary coordinates corresponding to the adjacent boundaries and judges whether or not minimal coordinate values are present in the regions. If no minimal point is detected in a region, the spot boundary coordinate determining section 268 does not recognize the boundary coordinates as boundary coordinates of a spots. In this embodiment, seven-point smoothing differentiation is effected.

Further, in the case where only slight changes in the density data caused by noise might be present, the spot boundary coordinate determining section 268 prevents such changes from being recognized as spots. Specifically, when two or more boundary coordinate values are contained in a predetermined number of pixels, for example, five pixels, the spot boundary coordinate determining section 268 recognizes only one of them as a boundary coordinate of a spot.

The spot boundary coordinate determining section 268 produces spot region data constituted of the y-coordinates of boundaries defining spots for each of the lanes based on the thus obtained boundary coordinates of spots and outputs them to the data synthesizing section 218. As in the previous embodiment, therefore, an image in which the lanes are divided by lane division lines and the spots have been divided by spot division lines, such as shown in FIG. 16, is displayed on the screen 400 of the CRT 60.

As in the previous embodiment, when an operator inputs data for modifying the display image data to the data modifying section 210 by operating the input device 70, the display image data are modified by the data modifying section 210 and an image is displayed on the screen 400 of the CRT 60 in accordance with the modified display image data.

Further, the spot boundary coordinate determining section 268 outputs the spot region data to the quantitative processing section 212 and the metabolite classification processing section 222. The quantitative processing section 212 makes a lane by lane calculation of the density data of pixels contained in the spots defined by the spot region data, namely, the amount emitted light (PSL value) from the stimulable phosphor sheet 1, and stores the density data of each spot in a predetermined area in the quantitative database in the quantitative data storing section 214.

Figure 28:
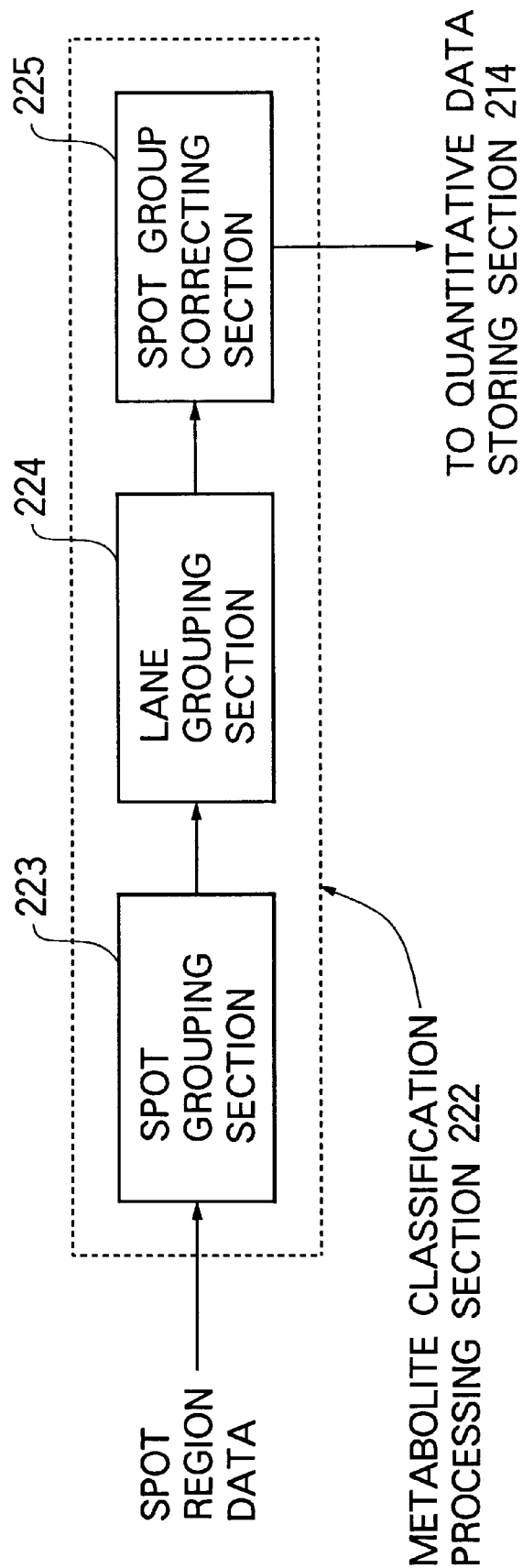
FIG. 28 is a block diagram showing a metabolite classification processing section.

FIG. 28 is a block diagram showing the metabolite classification processing section 222.

As shown in FIG. 28, the metabolite classification processing section 222 comprises a spot grouping section 223 for comparing every combination of two lanes based on the input spot region data, grouping spots in accordance with the agreement or disagreement of the spot division lines and allotting a group number to each group in order from the side from which the specimen was distributed, a lane grouping section 224 for grouping lanes by classifying lanes whose density data distributions are similar to the same group, and a spot group correcting section 225 for correcting the groups to which the spots are classified based on the result of the grouping effected by the lane grouping section 224.

Figure 29:
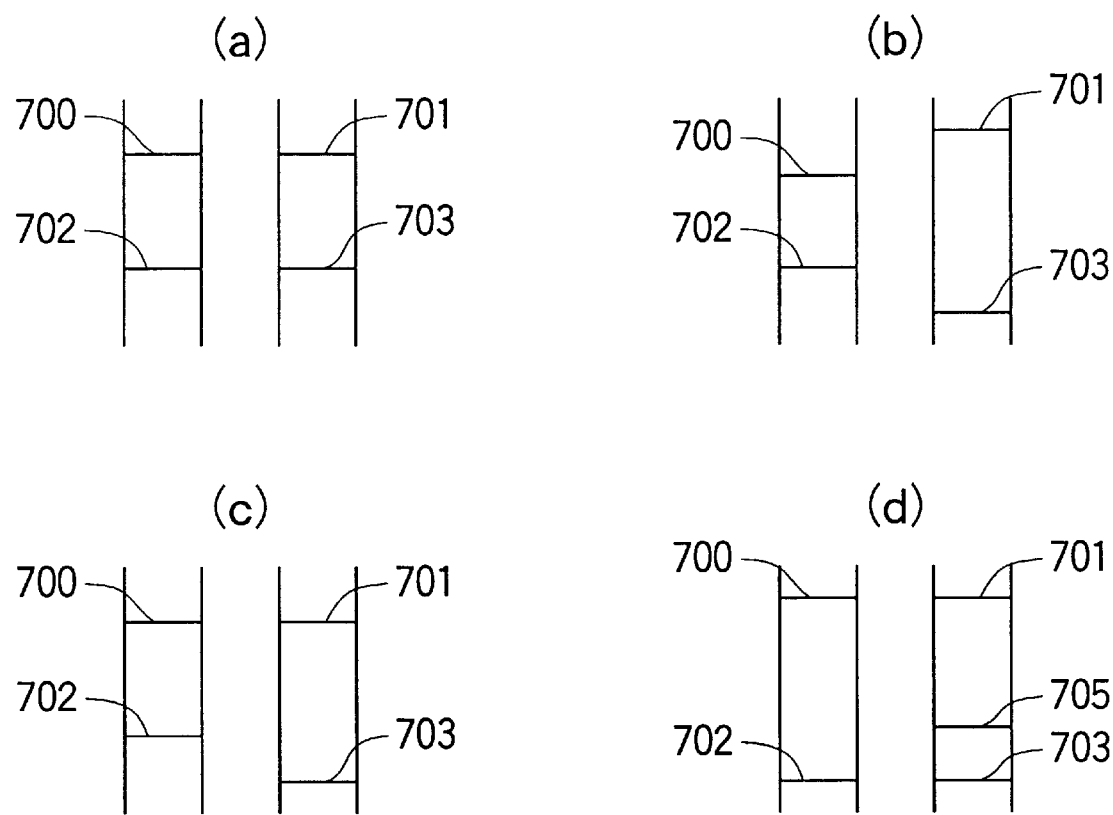
FIG. 29($a$), ($b$), ($c$), ($d$) is a view for describing processing effected by a metabolite classification processing section.

As shown in FIG. 29(*a*), when the spot grouping section 223 receives the spot region data, it compares positions of the spot division lines defining corresponding spots in two lanes and when the positions of the corresponding spot division lines 700 and 701, and 702 and 703 coincide, it classifies these spots to the same group. On the contrary, as shown in FIG. 29(*b*), when none of the positions of the corresponding spot division lines 700 and 701, and 702 and 703 coincide, the spot grouping section 223 classifies these spots to the different groups. On the other hand, as shown in FIG. 29(*c*), when one pair of the spot division lines defining the corresponding spots coincide but another pair of the spot division lines do not, the spot grouping section 223 compares the positions of peaks within the respective spots. When the positions of the peaks coincide, the spot grouping section 223 classifies these spots to the same group. Further, as shown in FIG. 29(*d*), when there are spot division lines 700 and 701, 702 and 703 whose positions substantially coincide but another spot division line 705 is present between the spot division lines 701 and 703 in one of the lanes, the spot grouping section 223 compares the positions of peaks in the 10 spots defined by the pair of spot division lines 700 and 702 and the pair of spot division lines 701 and 703 and when the positions thereof coincide, it classifies the spots to the same group, while it classifies the spots to different groups when the positions thereof do not coincide.

Thus, each lane is compared with all other lanes by sequentially comparing the lane L1 shown in FIG. 12 with the lanes L2 to L9, sequentially comparing the lane L2 with the lanes L3 to L9, sequentially comparing the lane L3 with the lanes M4 to L9 and so on, thereby grouping the spots contained in the lanes L1 to L9.

As a result of the grouping effected in the above described manner, the spots in one lane are always classified to different groups. Since grouping is effected by comparing each of the spots contained in one lane with all spots contained in all other lanes but not by comparing each of the spots with other spots contained in the sane lane, two or more spots contained in one lane may be classified to the same group. Therefore, in this embodiment, when two or more spots contained in one lane are grouped to the same group, the spot grouping section 223 compares the areas of the spots, leaves the spot having the largest area in the group and removes the other spot or spots from the group.

As a result, although the spots contained in one lane are classified to different groups, a certain spot may be classified to two or more groups. Therefore, for grouping each spot to a single group, the spot grouping section 223 of the metabolite classification processing section 222 checks the lanes in order from greater lane number to smaller lane number to determine whether or not a spot classified to the same group as spots classified to two or more groups is present in a lane having a smaller lane number than that of the lane containing the spot. When spots classified to the same group as spots classified to two or more groups are found in different lanes, the spot grouping section 223 classifies the spot to the same group of the spot found in the lane having the largest lane number. On the other hand, when two or more spots classified to the same group as spots classified to two or more groups are found in the same lane having a smaller lane number than that of the spot to be classified, the spot grouping section 223 calculates the ratios of the area of the spot to those of the spots retrieved in another lane and compares them to classify the spot to the group of the spot to which the ratio of the spot to be classified is maximum. On the contrary, when no spot is found in any lane having a smaller lane number than that of the spot to be classified, the spot grouping section 223 classifies the spot to the group having the minimum group number.

Then, the lane grouping section 224 of the metabolite classification section 222 groups the lanes by comparing the lanes L1 to L9 and selecting lanes containing most spots classified to the same groups, namely, lanes containing the most spot division lines which coincide with each other. At this time, when a pair of spot division lines in three or more lanes coincide but spots are present having a spot division line between the pair of spot division lines, a lane containing a spot having a greater area is classified to the same group as that of other lanes.

Thus, after the lane grouping has been completed, when spots grouped to different groups are present at corresponding positions between lanes grouped to the same group, the spot group correcting section 225 of the metabolite classification section 222 rewrites the spot grouping data by grouping the spots to the same group.

As described above, the group data produced by the metabolite classification section 222 are sent to the quantitative database in the quantitative data storing section 214 and data similar to those shown in FIG. 18 are stored in the quantitative database in the quantitative data storing section 214.

As in the previous embodiment, desired table data are produced by the table data producing section 216 and are output to the data synthesizing section 218, whereby a table is displayed on the screen 400 of the CRT 60 via the window memory 120.

According to this embodiment, since no processing for removing background noise is effected, it is possible to define regions to be quantified using a memory of small capacity within a short time without requiring an operator to conduct complicated operations. Further, since the positions of the peaks are estimated by effecting one dimensional Fourier transform instead of smoothing differentiation on the x-axis direction peripheral distribution data from which noise has been removed by the noise removing section 300, small peaks can be recognized with higher accuracy.

Moreover, since the coordinates of the region starting points AS and the region end points AE are not immediately recognized as boundary coordinates of spots but the boundary coordinates of spots are determined by judging whether or not maximal points are present between the coordinates of the region starting points AS and the region end points AE and whether or not two or more boundary coordinate values are contained in a predetermined number of pixels, it is possible to prevent portions where the density data change slightly due to noise components from being erroneously recognized as spots and to improve the accuracy of recognizing spots. Furthermore, in the previous embodiment, since spots are grouped based on their center coordinates, when the areas of two spots are large and a portion having high density data is present in the vicinity of one of the boundaries of one of the spots, even if the center coordinate values of portions having high density data of the spots substantially coincide, the fact that the coordinate value of the portion having high density data and the center coordinate value of another spot do not coincide leads to a risk of the two spots being grouped to different groups. However, according to this embodiment, since in the case where the positions of one pair of spot division lines coincides but the positions of another pair of spot division lines do not coincide, the spot grouping section 223 compares the positions of peaks within the respective spots and groups the spots to the same group when the peak positions coincide, even spots whose area is large and which contain a portion having high density data in the vicinity of one of the boundaries thereof can be grouped in a desired manner.

Figure 30:
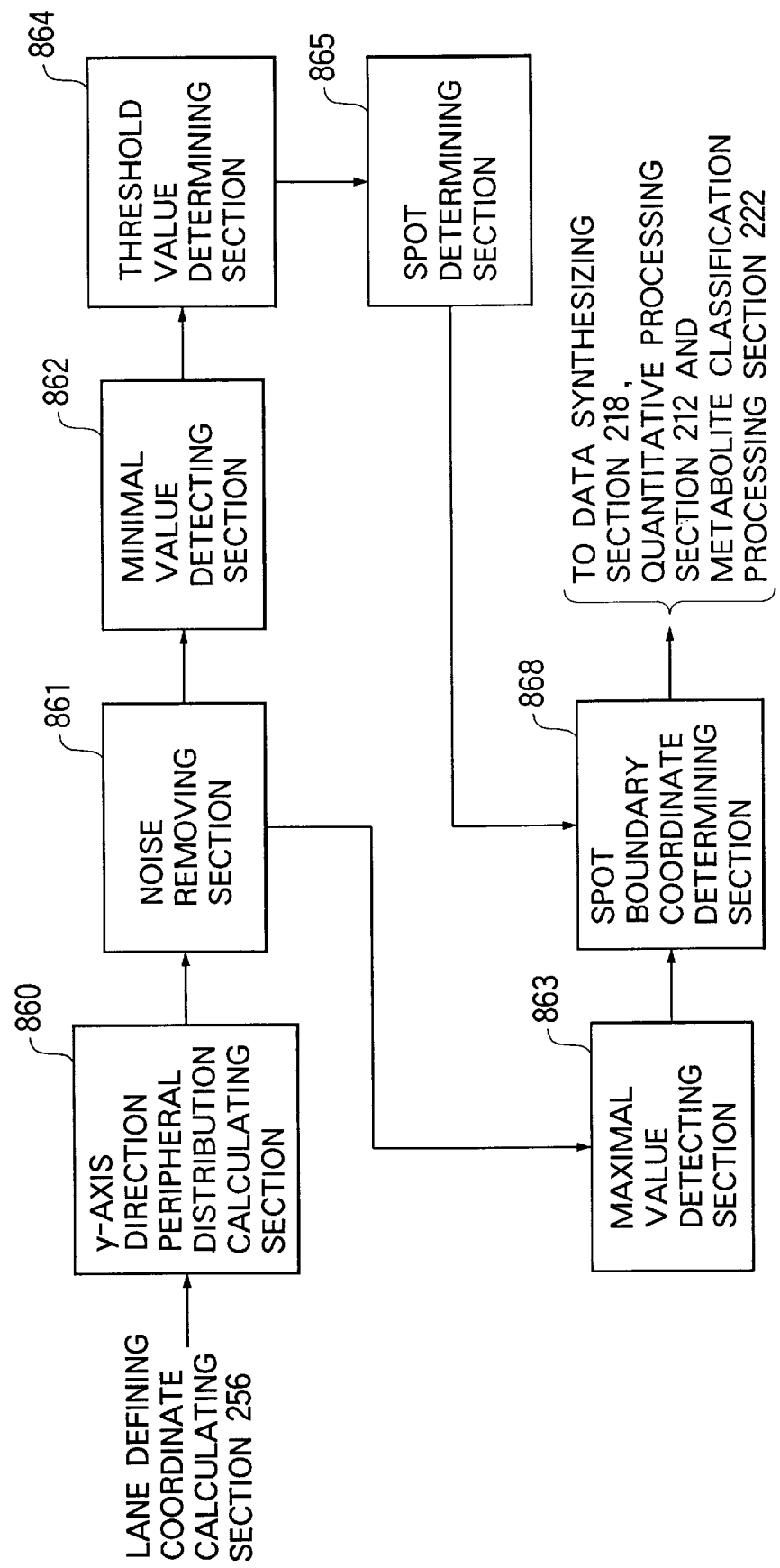
FIG. 30 is a block diagram showing a configuration of a spot recognition processing section in another embodiment of the present invention.

FIG. 30 is a spot recognition processing section of an image analyzing apparatus which is a further embodiment of the present invention.

As shown in FIG. 30, the spot recognition processing section 208 according to this embodiment comprises a y-axis direction peripheral distribution calculating section 860 for calculating y-axis direction peripheral distribution data indicating the peripheral distribution of the density data values in the y-axis direction by, in each defined line, calculating the sum in the x-axis direction of the density data of pixels having the same y-coordinate in the planar coordinate system in which the display image data are mapped, a noise removing section 861 for removing noise components of the y-axis direction peripheral distribution data calculated by the y-axis direction peripheral distribution calculating section 860, a minimal point detecting section 862 for detecting minimal values of the y-axis direction peripheral distribution data from which noise components have been removed, a maximal value detecting section 863 for detecting maximal values of the y-axis direction peripheral distribution data from which noise components have been removed, a threshold value determining section 864 for determining a threshold value for determining spots based on the minimal values detected by the minimal value detecting section 862, a spot determining section 865 for determining spots based on the threshold value determined by the threshold value determining section 864, and a spot boundary coordinate determining section 868 for determining spot boundary coordinates based on the spots determined by the spot determining section 865.

In the same manner as the y-axis direction peripheral distribution calculating section 160 of the first described embodiment, the y-axis direction peripheral distribution calculating section 860 sums up the density data of pixels having the same y-coordinate in each lane and repeats the same calculation for all y-coordinates to produce the y-axis direction peripheral distribution data, and outputs them to the noise removing section 861.

The noise removing section 861 removes noise components from the y-axis direction peripheral distribution data by effecting low-pass filter processing and median filter processing on the input y-axis direction peripheral distribution data and outputs the y-axis direction peripheral distribution data from which the noise components have been removed to the minimal value detecting section 862.

The minimal value detecting section 862 effects p-point smoothing differentiation on the y-axis direction peripheral distribution data from which the noise components have been removed and detects the minimal values from the data which was subjected to the p-point smoothing differentiation. In this embodiment, as in the above described embodiments, seven-point smoothing differentiation is effected. The thus detected minimal values are output to the threshold value determining section 864.

Figure 31:
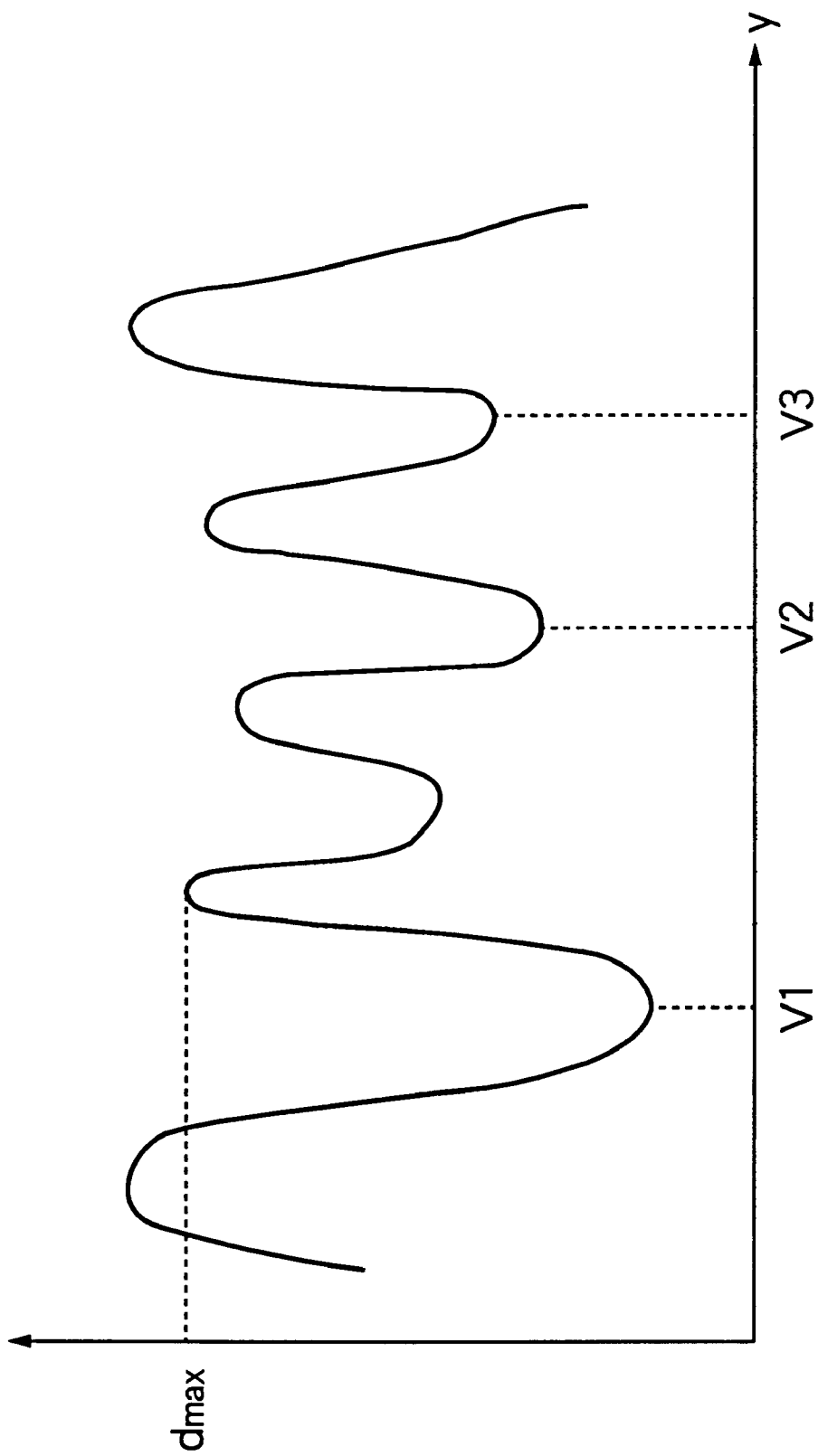
FIG. 31 is a graph showing a method for determining a threshold value.

The threshold value determining section 864 compares the input minimal values and selects "s" number of minimal values in order from smaller to larger, thereby determining the maximum values of the y-axis direction peripheral distribution data between the selected minimal values. As shown in FIG. 31, "s" is set to be equal to three in this embodiment and, therefore, three minimal values V1, V2 and V3 are selected, whereby the maximum value dmax of the y-axis direction peripheral distribution data therebetween is obtained. In FIG. 31, the maximal value between the minimal values V1 and V2 is selected as the maximum value. Then, the threshold value determining section 864 determines a threshold value whose value is "u" % of the detected maximum value and outputs it to the spot determining section 865. In this embodiment, "u" is set to be equal to 80%.

The spot determining section 865 determines the minimal values smaller than the threshold value input from the threshold value determining section 864 as spots and outputs them to the spot boundary coordinate determining section 868.

On the other hand, the maximal value detecting section 863 effects p-point smoothing differentiation on the y-axis direction peripheral distribution data from which the noise components have been removed and detects the maximal values from the data which was subjected to the p-point smoothing differentiation, and outputs them to the spot boundary coordinate determining section 868. In this embodiment, as in the above described embodiments, seven-point smoothing differentiation is effected.

Among the maximal values input from the maximal value detecting section 863, the spot boundary coordinate determining section 868 determines the coordinates of the adjacent maximal values between which the spots determined by the spot determining section 865 are located as spot boundary coordinates for determining the boundaries of spots.

Based on the thus obtained boundary coordinates, the spot boundary coordinate determining section 868 produces spot region data constituted of y-coordinates of boundaries for defining each spot in each lane, and outputs them to the data synthesizing section 218, the quantitative processing section 212 and the metabolite classification section 222 similarly to in the above described embodiments.

In the first described embodiment, a threshold value determined based on the maximum value of the y-axis direction peripheral distribution data is used to determine the region starting points AS and the region end points AE and spot division lines are determined therebetween. Therefore, if the maximum value of the y-axis direction peripheral distribution data in a lane is too great, namely, if portions having extremely low density data values are present in the lane and the values of the y-axis direction peripheral distribution data at the spot division line portions in the lane are too low in comparison with the maximum value, it is possible that no spot division line may be detected between the region starting points AS and the region end points AE. Although this problem can be mitigated by setting "j" for determining the threshold value to a smaller value, it is difficult to properly set the value of "j" for all images. However, according to this embodiment, since the threshold value for obtaining spot division lines is determined based on the maximum value of the y-axis direction peripheral distribution data at portions where spots are actually present, namely, the value of the y-axis direction peripheral distribution data at portions corresponding to spot division lines whose density data values are low, it is possible to properly determine the threshold value and determine the spot division lines for any image.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, although explanations were made as to thin layer chromatography methods in which a plurality of specimens are chromatographically distributed, the present invention is also applicable to a thin layer chromatography processes in which a single specimen is one-dimensionally chromatographically distributed.

Further, in the above described embodiment, explanation was made as to a case where regions of an autoradiographic image obtained by chromatographically distributing urine, bile and excrement gathered from test animals and using a stimulable phosphor sheet are defined. However, the present invention is not limited to such an autoradiographic image and can also be applied, for example, to an autoradiographic image of a gene produced by the Southern blot-hybridization method and an autoradiographic image of protein produced by poly-acrylamide gel electrophoresis. Further, the present invention is applicable for defining regions of a chemiluminescent image.

Further, in the first described embodiment, although spot region data are produced by the spot recognition coordinate calculating section 166 based on image data divided into lanes, in some cases, spot regions may be more accurately defined by an operator viewing an autoradiographic image displayed on the screen 400 of the CRT 60. In such a case, an autoradiographic image can be analyzed particularly rapidly, if lane defining coordinate data produced by the lane defining coordinate calculating section 156 and lanes of the autoradiographic image displayed on the screen 400 of the CRT 60 are automatically divided. In this sense, it is not always necessary for the spot recognition coordinate calculating section 166.to produce spot region data.

Figure 32:
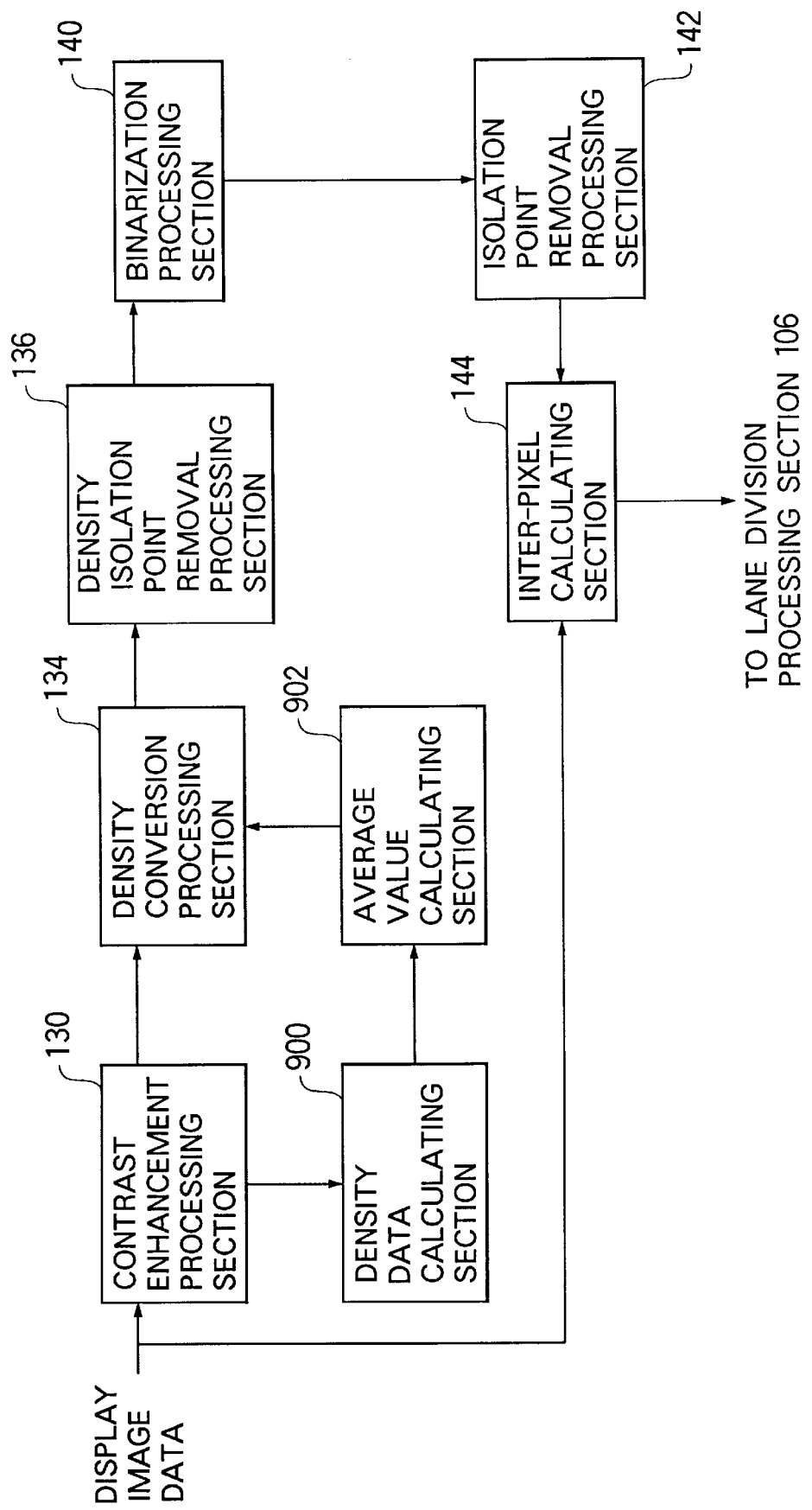
FIG. 32 is a block diagram showing a background noise processing section in a further embodiment of the present invention.

Furthermore, in the first described embodiment, the background noise processing section 104 comprises the contrast enhancement processing section 130, the density conversion parameter calculating section 132, the density conversion processing section 134, the density isolation point removal processing section 136, the binarization processing section 140, the isolation point removal processing section 142 and the interpixel calculating section 144 and uses these sections to remove data corresponding to the background noise. The background noise processing section 104 is, however, not limited to this configuration. For example, as shown in FIG. 32, instead of the density conversion parameter calculating section 132, the background noise processing section 104 may include a density data calculating section 900 for calculating density data of a desired regions selected using the input device 70 based on an autoradiographic image displayed on the screen of the CRT 60 and an average value calculating section 902 for calculating the area of the thus selected regions and calculating average values of the density data, namely, the density data values per unit area, based on the density data and the area, and the density conversion processing section 134 may use the value calculated by the average value calculating section 902 as a density conversion parameter "d" and produce output data values based on input data value "e" in the following manner.

Output data value=255 (d<e≦255)

Output data value=e (0≦e≦d)

Moreover, in the first described embodiment, although the background noise processing section 104 comprises the density isolation point removal processing section 136, the binarization processing section 140 and the isolation point removal processing section 142 for removing data corresponding to background noise, the binarization processing section 140 and the isolation point removal processing section 142 may be omitted or the isolation point removal processing section 142 may be omitted. Further, the contrast enhancement processing section 130 or the density conversion processing section may be omitted from the background noise processing section in the first described embodiment.

Furthermore, in the first described embodiment, although the x-axis direction peripheral distribution calculating section 150 of the lane division processing section 106 effects low-pass filter processing on the sum of density data and compares the processed data with the threshold value "i", it is possible to omit both or either processing.

Moreover, in the first described embodiment, the spot recognition coordinate processing section 166 recognizes a region as a spot only when the distance in the y-axis direction between each region starting point and the maximal point adjacent thereto, the distance between each adjacent pair of maximal points adjacent or the distance between each region end point and the maximal point adjacent thereto is greater than the threshold value "q". It is instead possible for the spot recognition coordinate processing section 166 to recognize a region as a spot irrespective of the distance in the y-axis direction between the region starting point and the adjacent maximal point, that between the adjacent maximal points or between the region end point and the adjacent maximal point.

Further, although the first described embodiment is constituted so that pixels constituting image data and having greater density data values are displayed as whiter pixels and that pixels having smaller density data values are displayed as blacker pixels, it is possible to display pixels to be whiter when they have smaller density data values and to display pixels to be blacker when they have greater density data values.

Furthermore, in the above described embodiments, although the image data are produced by using the stimulable phosphor sheet 1 and converting locational information regarding a radioactive labeling substance to an electrical signal and are displayed on the CRT 60 as a visible image, it is possible to once form a visible image on a photographic film instead of the stimulable phosphor sheet 1, photoelectrically read the visible image, convert it to an electrical signal and process the thus obtained image data in a similar manner to the above.

Moreover, in the second described embodiment, although image data which have been subjected to low-pass filter processing by the noise removing section 300 and from which high frequency noise components have been removed are subjected to hysteresis smoothing processing for removing fluctuations in density level therein, instead of the hysteresis smoothing processing, median filter processing or a moving average method may be effected. Similarly, although the noise removing section 261 produces the y-axis direction peripheral distribution data by effecting the median filter processing in addition to the low-pass filter processing, instead of the median filter processing, hysteresis smoothing processing or a moving average method may be effected.

Further, noise is removed from image data by removing background noise in the first described embodiment and in the second described embodiment, by effecting the low-pass filter processing and the hysteresis smoothing processing on the x-axis direction peripheral distribution data, and effecting the low-pass filter processing and the median filter processing and producing the y-axis direction peripheral distribution data. However, in the first described embodiment, noise may be removed from image data using the noise removing method used in the second described embodiment and in the second described embodiment, noise may be removed from image data using the noise removing method used in the first described embodiment.

Furthermore, in the first described embodiment, the spot recognition processing effected by the spot recognition processing section 208 in the second described embodiment may be effected instead of the spot recognition processing effected by the spot recognition processing section 108 and in the second described embodiment, the spot recognition processing effected by the spot recognition processing section 108 in the first described embodiment may be effected instead of the spot recognition processing effected by the spot recognition processing section 208.

Further, the processing effected by the spot boundary coordinate determining section 268 is optional and may be omitted from the second described embodiment and the processing effected by the spot boundary coordinate determining section 268 may be effected in the first described embodiment.

Moreover, in the first described embodiment, the processing effected by the metabolite classification processing section 222 in the second described embodiment may be effected instead of the processing effected by the metabolite classification processing section 122 and in the second described embodiment, the processing effected by the metabolite classification processing section 122 in the first described embodiment may be effected instead of the processing effected by the metabolite classification processing section 222.

Further, in the specification and appended claims, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide a biochemical image analyzing apparatus which can quickly define regions of interest to be quantified or quantitatively analyzed in a biochemical image without requiring an operator to conduct complicated operations.

What is claimed is:

1. A biochemical image analyzing apparatus comprising:
   image data storing means for storing image data of a biochemical image produced based on data obtained by converting to electrical signals locational information of a labeled substance contained in a sample produced by one-dimensionally distributing at least one specimen;
   display data producing means for selecting image data from among the image data stored in the image data storing means and processing the selected image data in a predetermined manner to produce display image data mapped in a planar coordinate system;
   display means for displaying an image based on the display image data; and
   first image data dividing means for producing first divided coordinate data by dividing the display image data along one coordinate axis of the planar coordinate system to produce lanes defining substantially rectangular regions to be quantified along the one axis,
   wherein the first image data dividing means comprises first peripheral distribution data calculating means for calculating data corresponding to periphery distribution along the one of the coordinate axes by summing up density data values of pixels having the same coordinate on one coordinate axis, lane starting point coordinate calculating means for calculating coordinates of starting points of the lanes based on the data corresponding to the periphery distribution calculated by the first peripheral distribution data calculating means, lane end point coordinate calculating means for calculating coordinates of end points of the lanes based on the data corresponding to the periphery distribution calculated by the first peripheral distribution data calculating means, and lane defining coordinate data producing means for producing lane defining coordinates for defining the lanes based on the coordinates of the starting points of the lanes calculated by the lane starting point coordinate calculating means and the coordinates of the end points of the lanes calculated by the lane end point coordinate calculating means.

2. A biochemical image analyzing apparatus in accordance with claim 1 wherein the first noise removing means is constituted so as to effect noise removing processing on the data corresponding to the periphery distribution calculated by the first peripheral distribution data calculating means, the lane starting point coordinate calculating means is constituted so as to calculate the coordinates of the starting points of the lanes based on the data corresponding to the periphery distribution from which the data corresponding to noise have been removed by the first noise removing means, and the lane end point coordinate calculating means is constituted so as to calculate the coordinates of the end points of the lanes based on the data corresponding to the periphery distribution from which the data corresponding to noise have been removed by the first noise removing means.

3. A biochemical image analyzing apparatus comprising:
   image data storing means for storing image data of a biochemical image produced based on data obtained by converting to electrical signals locational information of a labeled substance contained in a sample produced by one-dimensionally distributing at least one specimen;
   display data producing means for selecting image data from among the image data stored in the image data storing means and processing the selected image data in a predetermined manner to produce display image data mapped in a planar coordinate system;
   display means for displaying an image based on the display image data;

first image data dividing means for producing first divided coordinate data by dividing the display image data along one coordinate axis of the planar coordinate system to produce lanes defining substantially rectangular regions to be quantified along the one axis; and second image data dividing means for producing second divided coordinate data by dividing the display image data divided along the one coordinate axis along the other coordinate axis to form spots defining regions to be quantified along the other coordinate axis in each of the lanes, wherein the second image data dividing means comprises second peripheral distribution data calculating means for calculating data corresponding to periphery distribution along the other coordinate axis by summing up density data values of pixels having the same coordinates on the other coordinate axis, and spot defining coordinate data producing means for producing spot defining coordinates defining spots in each of the lanes based on the data corresponding to the periphery distribution calculated by the second peripheral distribution data calculating means.

4. A biochemical image analyzing apparatus in accordance with claim 3 wherein the second noise removing means is constituted so as to effect noise removing processing on the data corresponding to the periphery distribution calculated by the second peripheral distribution data calculating means, and the spot defining coordinate data producing means is constituted so as to calculate the spot defining coordinate data based on the data corresponding to the periphery distribution from which the data corresponding to noise have been removed by the second noise removing means.

5. A biochemical image analyzing apparatus in accordance with claim 6 wherein the spot defining coordinate data producing means comprises region starting point/end point detecting means for detecting starting points of regions and end points of regions by comparing the values of the data corresponding to the periphery distribution calculated by the second peripherally distributed data calculating means with a predetermined value, peak point detecting means for detecting peak points where derivatives of the data corresponding to the second periphery distribution between each of the starting points of the regions and each of the end points of the regions change sign, and the spot defining coordinate data calculating means for calculating the spot defining coordinates for forming the spots based on the starting portions of the regions, the end portions of the regions and the peak points.

6. A biochemical image analyzing apparatus comprising:

image data storing means for storing image data of a biochemical image produced based on data obtained by converting to electrical signals locational information of a labeled substance contained in a sample produced by one-dimensionally distributing at least one specimen;

display data producing means for selecting image data from among the image data stored in the image data storing means and processing the selected image data in a predetermined manner to produce display image data mapped in a planar coordinate system;

display means for displaying an image based on the display image data; and first image data dividing means for producing first divided coordinate data by dividing the display image data along one coordinate axis of the planar coordinate system to produce lanes defining substantially rectangular regions to be quantified along the one axis wherein the first image data dividing means comprises peak estimating means for estimating coordinates of peaks of the density data by effecting one-dimensional Fourier transform on the noise free data from which the data corresponding to noise have been removed by the first noise removing means, peak coordinate correcting means for correcting the coordinates of the peaks estimated by the peak estimating means, and the lane defining coordinate data producing means for producing the lane defining coordinates in accordance with the coordinates corrected by the peak coordinate correcting means.

7. A biochemical image analyzing apparatus comprising:

image data storing means for storing image data of a biochemical image produced based on data obtained by converting to electrical signals locational information of a labeled substance contained in a sample produced by one-dimensionally distributing at least one specimen;

display data producing means for selecting image data from among the image data stored in the image data storing means and processing the selected image data in a predetermined manner to produce display image data mapped in a planar coordinate system;

display means for displaying an image based on the display image data;

first image data dividing means for producing first divided coordinate data by dividing the display image data along one coordinate axis of the planar coordinate system to produce lanes defining substantially rectangular regions to be quantified along the one axis;

second image data dividing means for producing second divided coordinate data by dividing the display image data divided along the one coordinate axis along the other coordinate axis to form spots defining regions to be quantified along the other coordinate axis in each of the lanes; and group data producing means for producing group data indicating groups to which the spots in each of the lanes belong based on the lane defining coordinates and spot defining coordinates.

8. A biochemical image analyzing apparatus in accordance with claim 7 wherein the group data producing means comprises spot grouping means for comparing the spot defining coordinates of the lanes and groping the spots formed in each of the lanes, lane grouping means for comparing the spot defining coordinates of the lanes and grouping the lanes, and spot grouping correcting means for correcting the groups of the spots grouped by the spot grouping means based on the results of grouping of the lanes effected by the lane grouping means.

9. A biochemical image analyzing apparatus comprising:

image data storing means for storing image data of a biochemical image produced based on data obtained by converting to electrical signals locational information of a labeled substance contained in a sample produced by one-dimensionally distributing at least one specimen;

display data producing means for selecting image data from among the image data stored in the image data storing means and processing the selected image data in a predetermined manner to produce display image data mapped in a planar coordinate system;

display means for displaying an image based on the display image data;

first image data dividing means for producing first divided coordinate data by dividing the display image data along one coordinate axis of the planar coordinate system to produce lanes defining substantially rectangular regions to be quantified along the one axis; and background noise removing means for removing data corresponding to background noise of an image to be displayed on the display means from the display image data and producing background noise free image data and the first image data dividing means is constituted so as to produce the lane defining coordinates data for forming the lanes defining regions to be qualified along the one coordinate axis by dividing the background noise free image data along the one coordinate axis of the planar coordinate system in which the display image data are to be mapped.

10. A biochemical image analyzing apparatus in accordance with claim 9 wherein the background noise removing means comprises isolation point removing means for defining regions containing a plurality of pixels constituting the display image data and, when the density data of pixels at predetermined positions in the region are different from those of pixels at other positions in the region, converting the density data values of the pixels at the predetermined positions to predetermined values, thereby removing from the region pixels having density data isolated.

11. A biochemical image analyzing apparatus in accordance with claim 10 wherein the background noise removing means further comprises binarizing means for binarizing data output from the isolation point removing means, and second isolation point removing means for defining a region containing a plurality of pixels in the data output from the binarizing means and, when the density data of pixels at predetermined positions in the region are different from those of pixels at other positions in the region, converting the density data values of the pixels at the predetermined positions to predetermined values, thereby removing from the region pixels having density data isolated.

12. A biochemical image analyzing apparatus in accordance with claim 9 wherein as the density data value increases, an image corresponding to the pixels having the density data is displayed on the display means to be whiter and the background noise removing means further comprises contrast enhancing means for expanding the density data of pixels constituting the display image data to a predetermined range, thereby enhancing contrast, and density converting means for producing a density histogram of the display data whose contrast has been enhanced and allotting maximum values of density data to density data whose values are greater than density data determining a predetermined area of the density histogram therebelow and data whose density data have been converted are sent to the isolation point removing means.

13. A biochemical image analyzing apparatus in accordance with claim 9 wherein as the density data value increases, an image corresponding to the pixels having the density data is displayed on the display means to be whiter and the background noise removing means further comprises contrast enhancing means for expanding the density data of pixels constituting the display image data to a predetermined range, thereby enhancing contrast, and density converting means for calculating an average value of density data of pixels contained in a predetermined region selected from the display image data and allotting maximum values of density data to density data whose values are greater than the average value and data whose density data have been converted are sent to the isolation point removing means.

\* \* \* \* \*